US005715034A

United States Patent [19]

Yamamoto

[11] Patent Number: 5,715,034

[45] Date of Patent: Feb. 3, 1998

[54] INDEX PRINT PREPARATION AND FEEDING APPARATUS AND PHOTO-PRINTING AND DEVELOPING APPARATUS

[75] Inventor: Yuji Yamamoto, Wakayama, Japan

[73] Assignee: Noritsu Koki Co., Ltd., Wakayama, Japan

[21] Appl. No.: 575,328

[22] Filed: Dec. 20, 1995

[30] Foreign Application Priority Data

Jan. 11, 1995 [JP] Japan .................................... 7-002876
Feb. 24, 1995 [JP] Japan .................................... 7-036755

[51] Int. Cl.[6] ........................... G03B 27/00; G03B 27/32; G03B 27/46; G03B 27/52

[52] U.S. Cl. ................................ 355/40; 355/39; 355/41; 355/42; 355/43

[58] Field of Search ........................ 355/39–44; 395/101, 395/105; 358/78, 302, 350, 524, 452, 449; G03D 15/00; G03C 11/02

[56] References Cited

U.S. PATENT DOCUMENTS

| | | | |
|---|---|---|---|
| 4,574,692 | 3/1986 | Wahli | 101/2 |
| 4,951,086 | 8/1990 | Hicks . | |
| 5,119,126 | 6/1992 | Tokuda . | |
| 5,274,418 | 12/1993 | Kazami et al. | 355/40 |
| 5,473,402 | 12/1995 | Long et al. | 354/298 |
| 5,576,836 | 11/1996 | Sano et al. | 358/302 |

FOREIGN PATENT DOCUMENTS

| | | |
|---|---|---|
| 0 222 212 | 5/1987 | European Pat. Off. . |
| 0 255 480 | 2/1988 | European Pat. Off. . |
| 0 617 327 A1 | 9/1994 | European Pat. Off. . |
| 195 02 826 A1 | 8/1995 | Germany . |

OTHER PUBLICATIONS

Patent Abstracts of Japan, vol. 18, No. 689 (P-1850), 26 Dec. 1994 & JP-A-06 273856, 30 Sep. 1994.

Patent Abstracts of Japan, vol. 95, No. 2, 31 Mar. 1995 & JP-A-06 308617, 4 Nov. 1994.

Patent Abstracts of Japan, vol. 17, No. 273, May 26, 1993 & JP-A-05 011353.

*Primary Examiner*—R. L. Moses
*Assistant Examiner*—Shival Virmani
*Attorney, Agent, or Firm*—Armstrong, Westerman, Hattori, McLeland & Naughton

[57] ABSTRACT

An index print preparation and feeding apparatus comprising: a means for preparing index prints for a film; an order identifying means for identifying order information of the film; a means for storing a multiplicity of the index prints; a collating means which has a first identifying mechanism for recognizing the order information of the index print and a second identifying mechanism for recognizing the order information on a DP bag or film placed, and which collates the order information recognized by the first and the second mechanisms; and a means for feeding the index print to the feeding position.

11 Claims, 23 Drawing Sheets

INDEX PRINT PREPARATION AND FEEDING APPARATUS AND PHOTO-PRINTING AND DEVELOPING APPARATUS

BACKGROUND OF THE INVENTION

The present invention relates to an index print preparation and feeding apparatus and a photo-printing and developing apparatus, and more particularly to an apparatus for collating developed photographs with index prints in accordance with orders. That is, it relates to an index print preparation apparatus which is provided separately from an apparatus carrying out printing and developing treatment of photo prints; a photo-printing and developing apparatus with which the index print preparation apparatus is provided integrally as an index print preparation section; and a photo-printing and developing apparatus with the index print printing means built in.

The present invention also relates to an information card and an apparatus using the information card. More particularly, it relates to a photo-finishing apparatus that automatically calculates and indicates photo-processing prices in accordance with orders using the information card obtained by recording calculation information for photo-processing prices and/or photo-printing information in an index print or the like; a reprinting apparatus that can produce reprints with quality uniform to that of printed and developed prints since printing conditions at the time of reprinting are determined by the use of the information card; and a photo-printing apparatus which incorporates a device for preparing the information cards or a means for preparing the information cards.

Referring now to FIG. 23, the general process of developing and printing at a processing laboratory will be described.

In FIG. 23, a full line arrow, a dashed line arrow and a chain line arrow indicate treatment process of film, photo print and index print, respectively. The film F, photo print P, and index print IP after completion of the process are inserted into a DP bag 408. In FIG. 23, numeral 401 denotes a splicer, 402 a film developer, 403 a printer, 404 a paper developer, 405 a paper cutter, 406 an index printer, and 407 a film enveloper.

Now, the process will be explained in detail.

First of all, a film cartridge 400 with an untreated film inserted thereinto is inserted into the splicer 401. The splicer 401 links a multiplicity of films with tape and stores them in a roll film cassette 409 in the form of a roll. The roll film cassette 409 is set to the film developer 402, and the developed film is set to the printer 403.

In the printer 403, frame images of the film are printed on the roll-form photographic paper stored in the paper magazine 410 one by one, which is wrapped around a paper magazine 411 again. The paper magazine 411 is set to the paper developer 404 and the paper which has been developed is cut off by frames at the paper cutter 405 to produce the printed photograph P.

The film F finished with printing at the printer 403 is set to the index printer 406, cut into six frames each by the film enveloper 407, grouped by one film, and put into a negative bag sheet.

The index printer 406 is a device for preparing an index print IP on which frame images for one film are printed in one or more prints.

The developed film F prepared in this way, and printed photographs P and index prints IP which are collected in accordance with orders are put into the DP bag 408 after completion of collation by the operator. On the DP bag, the name and telephone number of the customer, type of negative film, and other information are entered when the order of photo processing is received, and the corresponding film F, printed photograph P, and index print IP must be put into the bag without mistake. Consequently, hitherto, a label carrying the number same as the order number carried on the DP bag 408 is affixed to the tip end of the film before development, and the label number of the treated film is visually checked and the film is put into the DP bag.

The index print is packed into the DP bag after visually checking it with the film or photo prints.

However, visual checking as described above needs an operator and there is a high possibility of making a mistake if there are orders with similar photographed images, which decreases work efficiency. There is also a problem of difficulty in automatization with this kind of system.

In addition, with the conventional method, the photo-processing prices for each order is calculated after the operator checks the number of prints or the length of film developed when he or she packs the prints or film into the DP bag, and the calculation results are affixed to the external bag for indication.

In order to prepare prints of the quality same as that of printed and developed prints at the time of reprinting, the printed and developed prints are attached at the time of reprinting, and the quality is unified by determining printing conditions while visually checking the tone, etc.

However, in the above-mentioned developing and printing process, an operator is required for checking the number of prints and inputting numerals at the time of calculating prices, which is troublesome and makes it difficult to automatize calculation and indication of the photo-processing prices for each order.

If attempt is made to prepare reprints with the quality same as that of the printed and developed prints, when the number of reprints are many, the number of printed and developed prints also increases, posing a problem of difficulty of checking them.

In view of the foregoing, it is an object of the present invention to provide an index print preparation and feeding apparatus as well as a photo-printing and developing apparatus, which can easily check index prints and films, and can meet automatization, A further object of the present invention is to provide a method and a device to automatically calculate and indicate the prices, a method and a device for unifying the quality of the reprint and that of printed and developed prints, and an information card for recording the information therefor and a device for preparing the card

SUMMARY OF THE INVENTION

An index print preparation and feeding apparatus according to one embodiment of the invention comprises:

- a means for preparing index prints in which a multiplicity of frame images of a film can be printed on one print,
- an order identifying means for identifying order information of the film,
- a means for storing a multiplicity of the index prints,
- a collating means which has a first identifying mechanism for recognizing the order information of the index print stored in the storing means and a second identifying mechanism for recognizing the order information on a DP bag or film placed at a feeding position, and which collates the order information recognized by the first and the second identifying mechanisms, and a means for feeding the index print checked by the collating means to match with order information to the feeding position, It is preferable that the order identifying means is a means for identifying the order by reading the order information recorded beforehand on the film or DP bag.

It is preferable that the order identifying means is a means for identifying the order by input by an operator.

It is further preferable that an order recording means for recording the order information to the corresponding index print is linked to the order identifying means, and the first identifying mechanism is designed to read the order information recorded on the index print by the order recording means.

It is also preferable that the storing means has a multiplicity of storing means and the first identifying mechanism is designed to recognize the order information of the index prints corresponding to the storing position.

It is further preferable that the second identifying mechanism is designed to read the order information recorded on the DP bag or film placed at the feeding position.

It is preferable that the second identifying mechanism is designed to recognize order information by input by the operator.

A photo-printing and developing apparatus according to another embodiment comprises:

a photo-printing and processing section comprising an order sorting means that can sort and hold printed and developed photographs in accordance with order and a first storage means for storing in memory the order information corresponding to the order of the printed photographs sorted order by order by the order sorting means, an index print preparation section comprising an index print preparation means for preparing an index print for every order of the printed photographs and a second storage means for storing in memory the order information as corresponding index print information, and an information transmission means for linking the photo-printing and processing section to the index print preparation section wherein the photo-printing and developing apparatus is designed to collate the order information stored in the first storage means with that in the second storage means and to feed the corresponding index print to the order sorting means.

The photo-printing and developing apparatus according to another embodiment comprises:

a photo-printing and processing section comprising an order sorting means that can sort and hold printed and developed photographs in accordance with order, a first recording means for recording corresponding information order by order on the printed photographs, and a first reading means for reading the order information recorded by the first recording means and storing in memory the order number of the printed photographs stored at the order sorting section, and an index print preparation section comprising an index print preparation means for preparing an index print by orders of the printed photographs, a second recording means for recording the order information on the corresponding index print, and a second reading means for reading order information recorded by the second recording means wherein the photo-printing and developing apparatus is designed to collate the printed photographs with the order information recorded on the index print and feeding the corresponding index print to the printed photographs sorted order by order by the order sorting means.

The photo-printing and developing apparatus according to yet another embodiment is a photo-printing and developing apparatus including a built-in index print printing means, wherein the index print is printed before printing the first frame or after printing the last frame in one order.

It is preferable to read the image information of each frame in one order by a scanner, transmit the information to the digital system index print printing means, and print the index print.

It is preferable that the index print printing means comprises a printing lens exchanging means or printing lens moving means, and a paper mask which shields light at an optional position of a frame.

The information card according to an embodiment of the present invention is characterized in that calculation information on photo-processing prices in accordance with orders and/or photo-printing information is recorded therein.

It is preferable that the information card is an index print.

It is also preferable that the information card is an index print in which the information is recorded on the image forming surface of the index print.

Moreover, it is preferable that the information card is one or more pieces of regular prints in one order.

The photo-finishing method according to the present invention comprises the steps of reading the information recorded on the information card, and calculating and indicating the photo processing prices order by order.

The photo-finishing apparatus according to one embodiment of the invention comprises a reading means for reading information from the information card and a price calculating and indicating means for calculating and indicating photo-processing prices of the order based on the information read by the reading means.

The reprinting method according to the invention comprises the steps of reading the information from the information card and confirming photo-printing conditions at the time of reprinting (that is, reading record information such as density correction value of printing, each YMC color correction value, color of source light, and the like and executing correction control of the photo-printing apparatus) or determining such conditions.

The reprinting apparatus according to claim 20 comprises a means for reading information from the information card, a means for storing in memory the information read from the reading means, and a control means for establishing printing conditions at the time of reprinting by extracting from the storage means the printing information of the corresponding frames based on the frame number entered by an input mechanism, the control means being linked to the storing means.

The information card preparation apparatus according to the invention is a device for preparing the information card comprising:

a means for taking in information to be recorded on the information card from a photo-printing apparatus, and a means for recording the information taken in from the take-in means into the card.

In addition, the information card preparation apparatus according to the invention comprises:

an index print preparation means that can print plural frame images of a film inserted into a film entrance onto one print, a means for taking in photo-processing price calculation information and/or photo-printing information order by order from a photo-printing and developing apparatus, a storage means for storing in memory the information taken in by the take-in means, a means for reading an order number of the film inserted into the film entrance, and a means for extracting from the storage means the information corresponding to the order number based on the order numbers read by the reading means.

In the information card preparation apparatus described in another embodiment, it is preferable to equip an input means for inputting the order number of the film inserted into the film entrance by an operator in place of the reading means.

The photo-printing apparatus according to the invention having an information card preparation means built in and preparing the information card by recording information on the rear surface of one or a multiplicity of regular prints one order, by recording the information together with the index print before the first frame or after the last frame for each order, or by recording the information separately as an information dedicated print, comprises:

a means for taking in the information to be recorded on the information card, a control means for storing in memory the information for each order to be recorded on the information card, and a recording means linked to the control means and for recording the information to the corresponding print.

The index print preparation and feeding apparatus records the order number on the index print when the index print is prepared at the index print preparation means. The apparatus reads the order number affixed to the corresponding DP bag or the order number affixed to the developed film, and feeds the suitable index print when the printed photographs for one order having been completed with development are placed into the corresponding DP bag.

The photo-printing and developing apparatus stores in the first and the second storage means, respectively, the order number of the printed photographs stored in the order sorting means and the order number of the index print prepared at the section separate from the section for printing and developing. The first and the second storage means are linked by an information transmission means and the order numbers in storage are collated.

The photo-printing and developing apparatus writes the order number on the rear surface of the printed photograph and the rear surface of the index print, and collates by reading the order numbers.

The photo-printing and developing apparatus prints the index print to the same photographic paper after one order of the photographs is printed and collates by discharging the index print to the order sorting section together with the printed photographs.

The photo-printing and developing apparatus allows the image to be read by the scanner at the same time one order of photographs is printed, stored in the digital system index print printing means, and edited for the index print. The edited image is printed to the same photographic paper on which one order of the photographs has been printed.

The photo-printing and developing apparatus sets the negative film to the index print printing means after one order of photographs is printed. The frame image of the film is printed in order on the index print screen of the same photographic paper on which one order of photographs has been printed by the printing lens moving means and the paper mask moving means.

In the information card, in addition to the order number, there are recorded the frame number, the print size or number of required prints of the corresponding frames; correction value determined at the time of printing and developing, and type of photo-printing apparatus; and information such as store code, that is, the information required for calculating photo-processing prices and/or the information related to printing conditions of printing and developing.

If the information card is the index print, it is possible to check the whole order at a glance at the time of price calculation. At the time of reprinting, if the index print is used to order reprints, simultaneous processing is possible and the operation process is not increased, and the above-mentioned information can be recorded on the index print when the index print is prepared.

If the information card is the one that records the information on the index print image forming surface, all that is required is to see the surface of the print (image forming surface) and it is no longer necessary to turn the print over and see the surface.

If the information card is one or a multiplicity of regular prints on which the information is recorded, the index print preparation apparatus is not required and improvement from the existing photo-printing system becomes much easier.

On the other hand, because the photo-finishing method and apparatus according to the invention utilize the information card to take in the information necessary for calculating the price from the information card, calculation and indication of the price can be carried out speedily and without any error, and can be automatized.

In addition, because the reprinting method and apparatus according to the invention utilize the information card to take in the information related to printing condition of printing and developing from the information card, it is easy to match the printing conditions at the time of reprinting to those of printing and developing, whereby producing prints with uniform quality.

The information card preparation apparatus is provided to the photo-printing apparatus and takes in the information from the take-in means linked to the photo-printing apparatus, and records the information on the index print by a recording means to make it an information card. The apparatus records the information on the rear surface or the image forming surface (surface) of the index print prepared by other apparatus to make it an information card. In addition, it can extract one or a multiplicity of photo prints in one order, record the information on the rear surface to make it an information card.

The information card preparation apparatus has an index print card preparation means built in, and at first stores the information taken in from the photo-printing and developing apparatus, reads the order number of the film inserted into the film entrance of the apparatus once again, extracts the corresponding information from the storage means to record it in the index print.

In the information card preparation apparatus, the operator might enter the order number in place of using the means for reading the order number.

In addition, the photo-printing apparatus has a built-in information card preparation means, reads the information to be recorded on the information card by a scanner or magnetic reader, stores it in a control means, and records it to the corresponding print.

DETAILED DESCRIPTION OF THE INVENTION

Referring now to the accompanying drawings, an index print preparation apparatus and a photo-printing apparatus according to the present invention will be described in detail.

Embodiment 1

Figure 3:
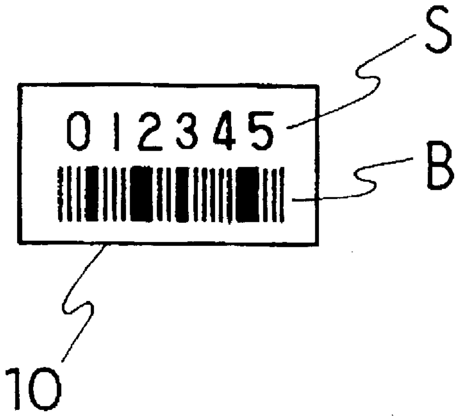
FIG. 3 is an explanatory view of one example of a label used for the film or DP bag applied to the index print preparation and feeding apparatus and photo-printing and developing apparatus.

The index print preparation and feeding apparatus is attached to the apparatus for carrying film development and the apparatus for carrying printing and developing of photographs. To the film to be inserted into the index print preparation and feeding apparatus of Embodiment 1 and the DP bag in which the film is contained, a seal 10 carrying both bar code B and Arabic numeral S is affixed as shown in FIG. 3. This enables both automatized collation and visual collation.

The order information means the name of the customer, name of the store, identification number of the DP bag, address of the customer, telephone n-tuber to be contacted, ID number, and other information, and is preferably recorded on the film or DP bag as a bar code to be used for collation of, for example, index prints. However, in the present invention, the order information might be simple Arabic numerals of, for example, 3 to 5 lines. This is because special emphasis is placed on automatized or easy collation of the developed film with the index print corresponding to the film. Consequently, the order information is hereinafter called simply order number.

Figure 1:
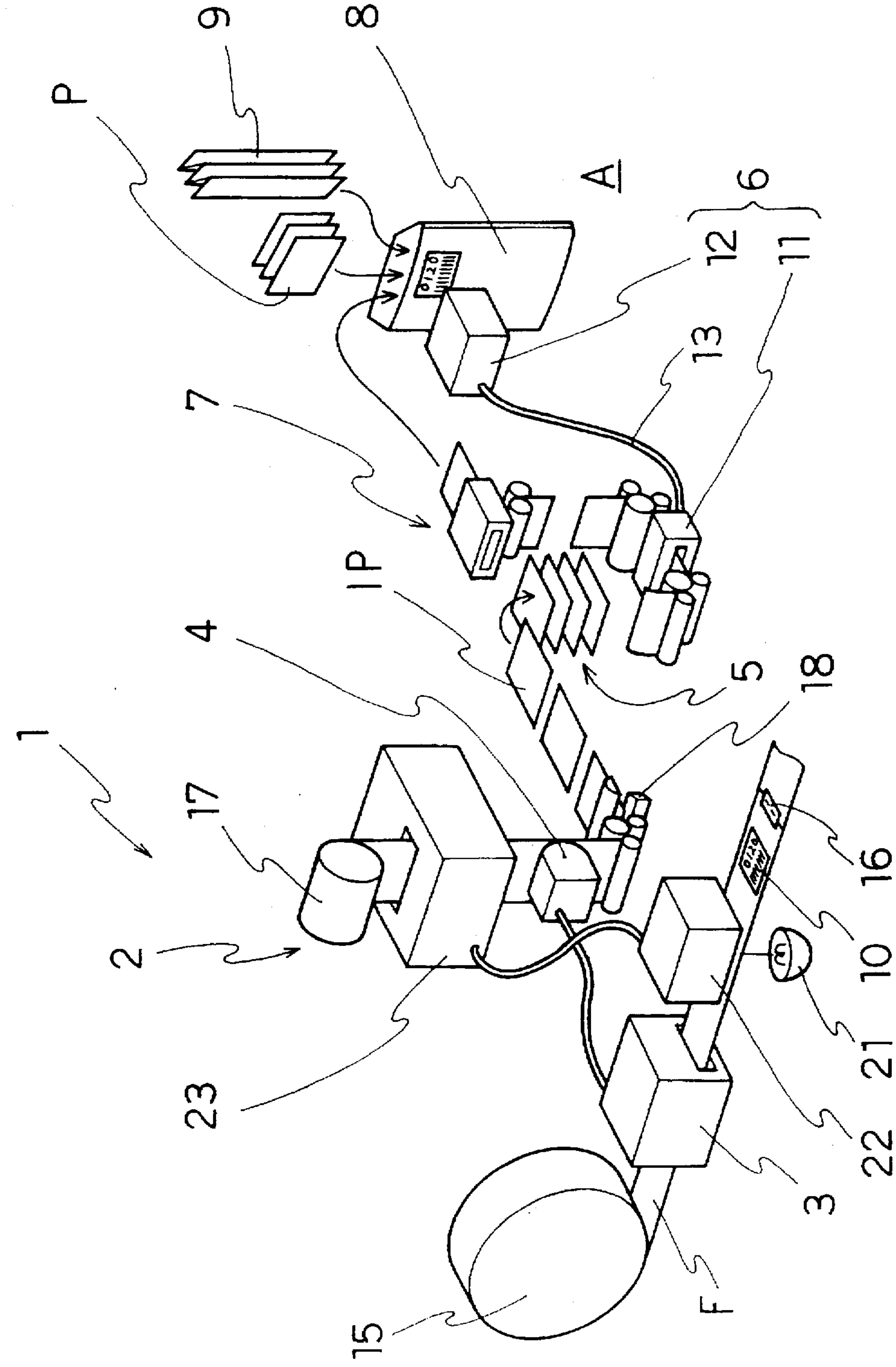
FIG. 1 is a structural explanatory view of one embodiment of an index print preparation and feeding apparatus.

FIG. 1 illustrates one example of the arrangement of the index print preparation and feeding apparatus 1, and numeral 2 indicates an index print preparation means (hereinafter called simply preparation means), 3 an order identifying means, 4 an order recording means, 5 a storing means, 6 a collating means, 7 a feeding means, 8 a DP bag, 9 a negative bag sheet, P a printed photograph, IP an index print, 10 a seal on which an order number is written, and A a feeding position.

In FIG. 1, for simplification, only the main portions are shown for film F, paper 17 on which the index print IP is printed, and an equipment for transporting the printed index print IP. In a roll film cassette 15, a multiplicity of developed films F are stored in a roll form with their ends linked with a tape 16. The film transporting device pulls out the film F from the roll film cassette 15 and transports it to the preparation means 2. The paper transporting device pulls out roll-form paper 17, cuts off sheet by sheet by a cutter 18 after printing is finished, and transports them to the storing means 5. The index print transporting device takes out index prints IP one by one from the storing means 5, and transports them to the feeding position A.

The preparation means 2 is equipped with a light source 21, a scanner 22, and a thermal printer 23, and can print a multiplicity of frame images of the developed film F on one sheet of the print. In general, because frame images of one film are printed onto one or two sheets of print and used as an index of the corresponding film, it is called an index print IP. For a means to prepare this kind of index print, it is possible to use conventional printers such as thermal dye sublimation transfer printers, ink-jet printers, dot impact printers, CRT and LCD printers, and laser printers.

The order identifying means 3 recognizes the order number and transmits it to the order recording means to write the order number on the rear surface of the index print. In this embodiment, for such an order identifying means 3, a bar code reader is employed and is disposed on the route where the film is transported so that the bar code of the seal 10 affixed to film F can be automatically read. The bar code reader reads the order number by, for example, infrared operation, and transmits to the order recording means 4.

The order recording means 4 prints the order number read by the order identifying means 3 on the rear surface of the index print IP and the like. The order number recorded by the order recording means 4 is read by the first identifying mechanism 11 and collated with the order number on the DP bag 8. In this embodiment, because the order recording means is a bar code printer, the first identifying mechanism 11 is a bar code reader.

Figure 2B:
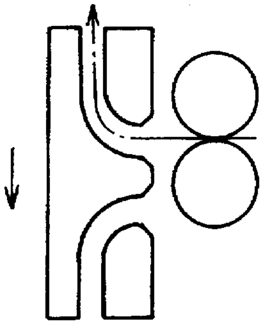
FIGS. 2(*a*) and 2(*b*) are structural explantory views of one example of storing means in the index print preparation and feeding apparatus of FIG. 1.
Figure 2A:
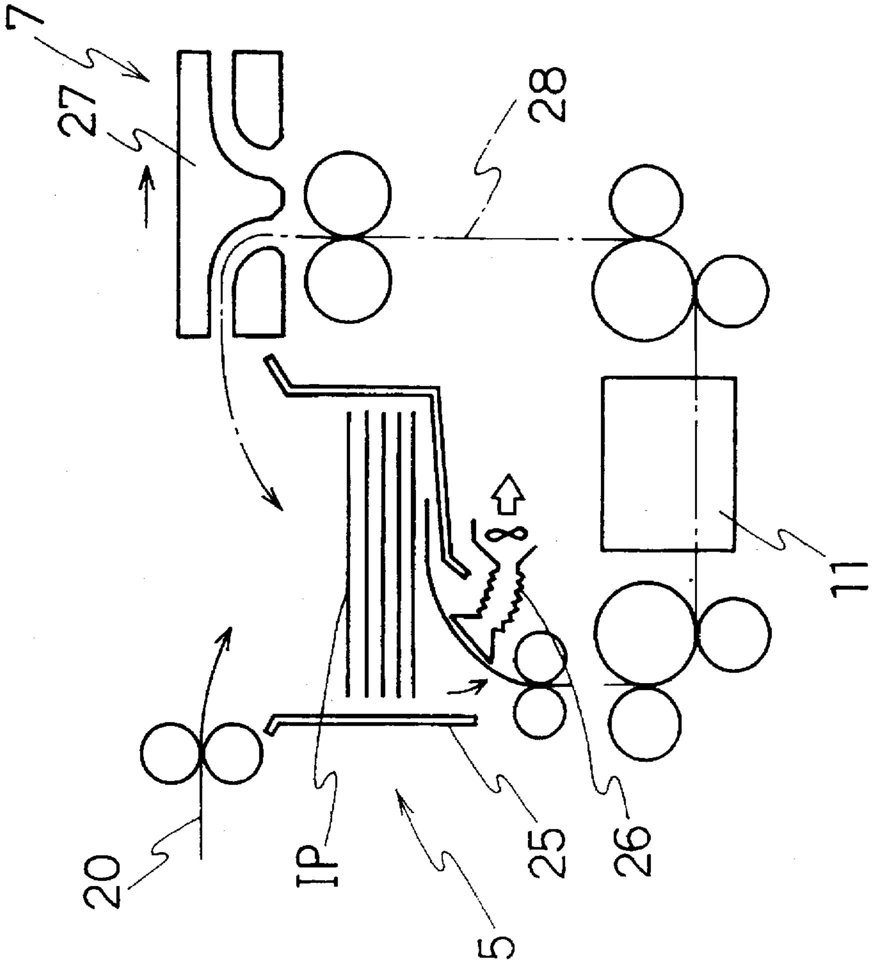

The storing means 5 comprises a housing 25 with nearly one half the bottom surface being open as shown in FIG. 2 and stores the index print IP carried from direction shown with the full line arrow 20 by piling them in the order of transportation. On the open bottom surface of this housing 25, a suction mechanism 26 connected to the vacuum source is provided to enable the index print IP to be removed from below one at a time. The removed index print is transported by the index print transporting device in the direction shown with a chain line arrow.

The collating means 6 is equipped with the first identifying mechanism 11 and the second identifying mechanism 12 as shown in FIG. 1. In this embodiment, the first identifying mechanism 11 is a bar code reader for reading the bar code printed on the rear surface of the index print IP, and is connected to the second identifying mechanism 12 by the connection code 13. The second identifying mechanism 12 is a bar code reader for reading bar codes on the DP bag or film, the mechanism being placed at the space A (feeding position) for placing negative bag sheet 9 and printed photographs P in the DP bag 8. For this kind of bar code reader, a stand type as used at supermarket registers and a handy type might be adopted.

The collating means 6 is also equipped with a mechanism for collating the order number read by the first and the second identifying mechanisms 11, 12 and controls the operation of the linked feeding means 7.

The feeding means 7 is disposed on the index print transportation route between the first identifying mechanism 11 and the feeding position A. This feeding means 7 has a mechanism for returning the index print to the storing means 5 and a fork-shaped arm 27 which serves as a branch for sending the index print to the returning mechanism or to the feeding position A as shown in FIG. 2, and is operated by the instructions from the collating means 6.

When the DP bag 8 or film 9 is placed at the feeding position A, the second identifying mechanism reads the order number. The feeding means 7 removes the index print successively from below the storing means 5 and the first identifying means 11 reads the order number.

If the order numbers being read differ from each other, as shown in FIG. 2(*a*), the arm 27 moves on the right side in the drawing and returns the index print to the storing means 5.

If the order numbers being read are the same, as shown in FIG. 2(*b*), the arm 27 moves on the left side in the drawing and transports the index print to the feeding position A.

Because in the apparatus of Embodiment 1, the above constitution is adopted, only setting of a roll film cassette 15 to a specified position enables automatic collation of the film or DP bag with the index print corresponding to it.

Embodiment 2

In Embodiment 1, a bar code reader for reading the order number of the film in the film transporting process is used for the order identifying means 3.

In addition to this, the order identifying means in the present invention might be designed to read the bar code affixed to the DP bag. In such case, it is possible for an operator to use a handy type bar code reader to read the order number.

Embodiment 3

In addition, as an order identifying means 3 in the present invention, a CPU to which an operation panel and a keyboard is connected is effective, in which the operator reads the order number affixed to the film and the DP bag for entry.

In such case, it is possible to apply the present invention to the film and the DP bag with a conventional label carrying only Arabic numerals, instead of one carrying the bar code B as shown in FIG. 3.

The order number being entered is converted to a bar code by CPU and printed on the rear surface of the index print by the order recording means 4. The printed bar code is automatically read by the first identifying mechanism 11 and collated with the order number of the DP bag and the like placed at the feeding position,

Embodiment 4

In Embodiments 1 to 3, the bar code is used in the order recording means and the first identifying mechanism.

In addition to this, the index print preparation and feeding apparatus of the present invention might employ a mechanism, as the first identifying mechanism, which does not record the order number on the rear surface of the index print but can identify the order number corresponding to the order from below of the index prints stored successively from the bottom.

In that case, when the order number of the DP bag placed at the feeding position is identified by the second identifying mechanism, the index print is sent till the index print with that order number comes out. The number of the index prints sent is checked and the corresponding index print is taken out.

The index print might be designed to be fed when the DP bag with the order number same as the order number of the index print stored at the bottom is placed on the feeding position, and when the different DP bag is placed, an alarm such as sounding a buzzer might be designed to be issued. It is also possible to select the DP bag by displaying the order number of the index print on the feeding device.

Next explanation will be made on the operation of the index print preparation and feeding apparatus of Embodiment 4.

The first identifying mechanism in Embodiment 4 stores in memory the order number in the order of being stored in the storing means with respect to the order number identified by the order identifying mechanism. When the second identifying mechanism reads the order number of the DP bag placed at the feeding position, the second identifying mechanism finds the index print corresponding to the number from the storing means and feeds the index print.

Embodiment 5

In Embodiment 4, a storing means comprising one piece of housing 25 is used. However, it is possible to use a storing means with a plurality of storing positions (housings, trays, etc.) and to design the first identifying mechanism 11 as a mechanism for storing the order number in memory corresponding to the storing position.

For example, the storing means is composed of a plurality of circulatable trays, and the index print transported from the preparation means is accommodated in the tray one at a time.

The first identifying mechanism 11 stores in memory with respect to the tray position in which tray the index print of the specific order number is accommodated.

When the second identifying mechanism 12 reads the order number of the film or the DP bag at the feeding position, the position of the tray in which the corresponding index print is accommodated is found out and the index print is removed from the tray and transported to the feeding position.

Embodiment 6

In Embodiments 1 to 5, the bar code reader for reading the bar code of the DP bag or the film placed at the feeding position A is used.

In addition to this, for the second identifying mechanism 12 in the present invention, CPU connected with the operation panel, key board and the like can be used.

In that case, the operator visually reads the order number affixed to the DP bag or the film placed at the feeding position A, operates the operation panel or key board to enter the order number. When the first identifying mechanism 11 identifies the index print of the number equal to the entered order number, the feeding means 7 transports the index print to the feeding position A.

Embodiment 7

Now referring to FIGS. 4 to 5, one embodiment of the photo-printing and developing apparatus will be explained.

Figure 4:
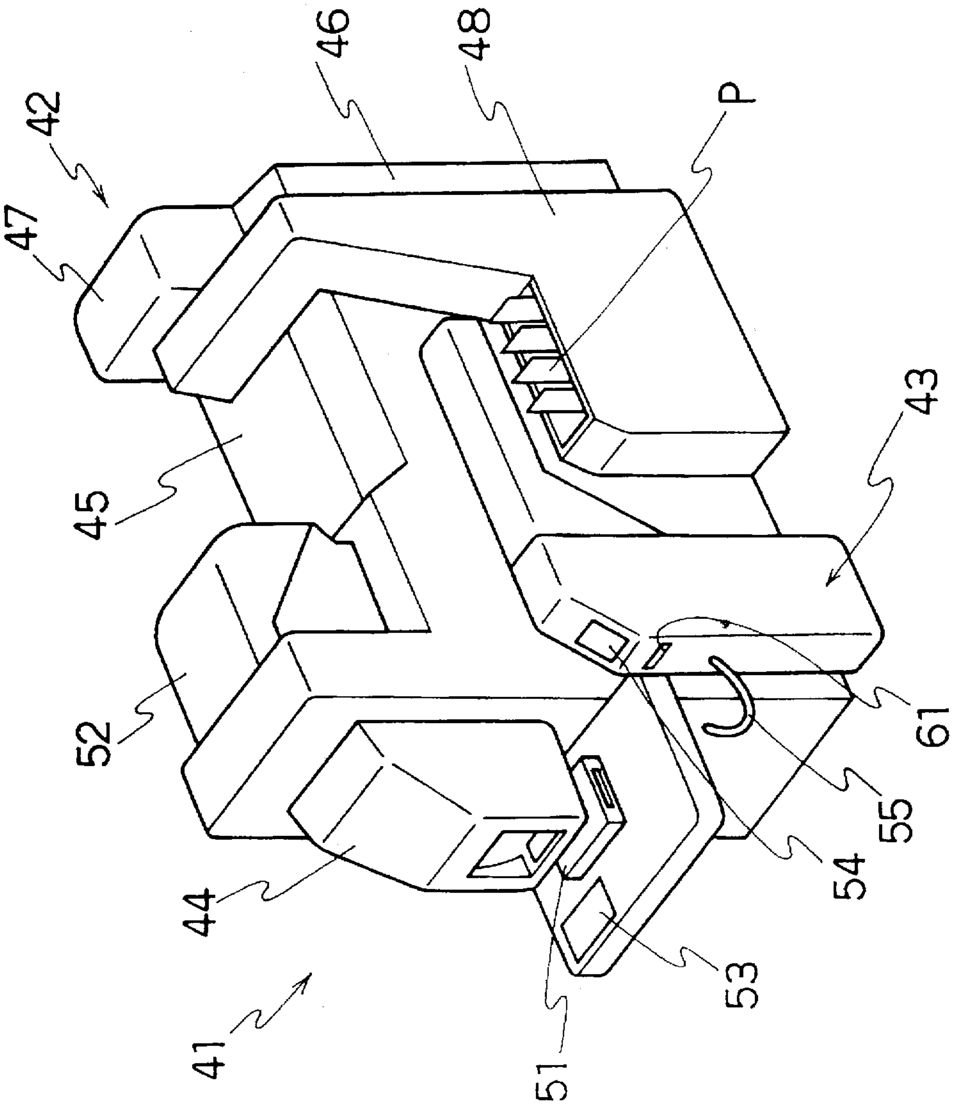
FIG. 4 is a schematic view of the appearance of one embodiment of a photo-printing and developing apparatus.

FIG. 4 is a schematic view showing the appearance of a photo-printing and developing apparatus 41 of the present invention. This photo-printing and developing apparatus 41 comprises a photo-printing and developing section 42 and an index print preparation section 43.

For the photo-printing and developing section 42, the one similar to those used conventionally might be adopted, and it comprises a printing section 44, a developing section 45, a drying section 46, a paper cutting section 47, and an order sorting section 48. The photo-printing and developing section 42 prints frame images of the developed film inserted into the negative mask 51 on the band-form photographic paper set to the paper magazine 52, develops and dries the printed photographic paper, then cuts off the paper frame by frame at the paper cutting section 47, and discharges a portion of one order to the order sorting section 48. The portion of one order means one piece of film inserted into the film cartridge.

The index print preparation section 43 includes a film entrance 61, and reads the image of film F inserted from the entrance 61 with a scanner 62, prints the images on the roll paper 64 with a print head 63, and cuts into a suitable size by a paper cutter 65. The suitable size means, for example, the size which includes all the frame image for one order. The cut index print IP is temporarily stored in a box-shape storing section 66, and transported to the order sorting section 48 of the photo-printing and developing section 42 by a transportation means 69. The transportation means 69 is equipped with a suction mechanism 67 for sucking and removing the index print one at a time and a transport belt 68 to which the suction mechanism 67 is securely fixed.

For the print head 63, the type same as thermal dye sublimation transfer explained in Embodiment 1 can be used.

The photo-printing and developing apparatus 41 shown in FIG. 4 is configured in such a manner that an index print preparation section 43 is built in beside the photo-printing section 42. Only by inserting the film with printed frame images into the film entrance 61 of the index print preparation section 43 located just beside while carrying out conventional photo-printing and processing, an index print can be prepared easily, and at the same time, the print photographs and index print of corresponding order are discharged in a block.

As shown in FIG. 4, the photo-printing and developing section 42 and the index print preparation section 43 have a keyboard 53 or 54, respectively. The photo-printing and developing section 42 and the index print preparation section 43 have CPU and the memory (the first and the second storage means built in, respectively, and these are linked by the information transmission cord 55.

First of all, the operator enters the order number affixed to the film through the keyboard 53 at the time of printing at the photo-printing and developing section 42. Thereby, the order number of the printed photograph P to be sorted by the order sorting section 48 is stored in the first memory means.

Then, also in the index print preparation section 43, the operator enters the order number through the keyboard 54. Thereby, the second memory means stores the order number in memory in the order of preparation.

The first storage means of the photo-printing and developing section 42 is linked to the second storage means of the index print preparation section 43 by the information transmission cord 55, and the order number of the printed photographs P discharged to the order sorting section 48 is transmitted from the first storage means to the second storage means. The second storage means collates whether the order number of the index print IP stored at the bottom of the storing section 66 is equal to the order number transmitted from the first storage means, and if it is equal, the second storage means drives the transportation means 69 to feed the index print IP to the order sorting section 48. If it differs, the second storage means issues or displays an alarm to notify the operator.

Figure 5:
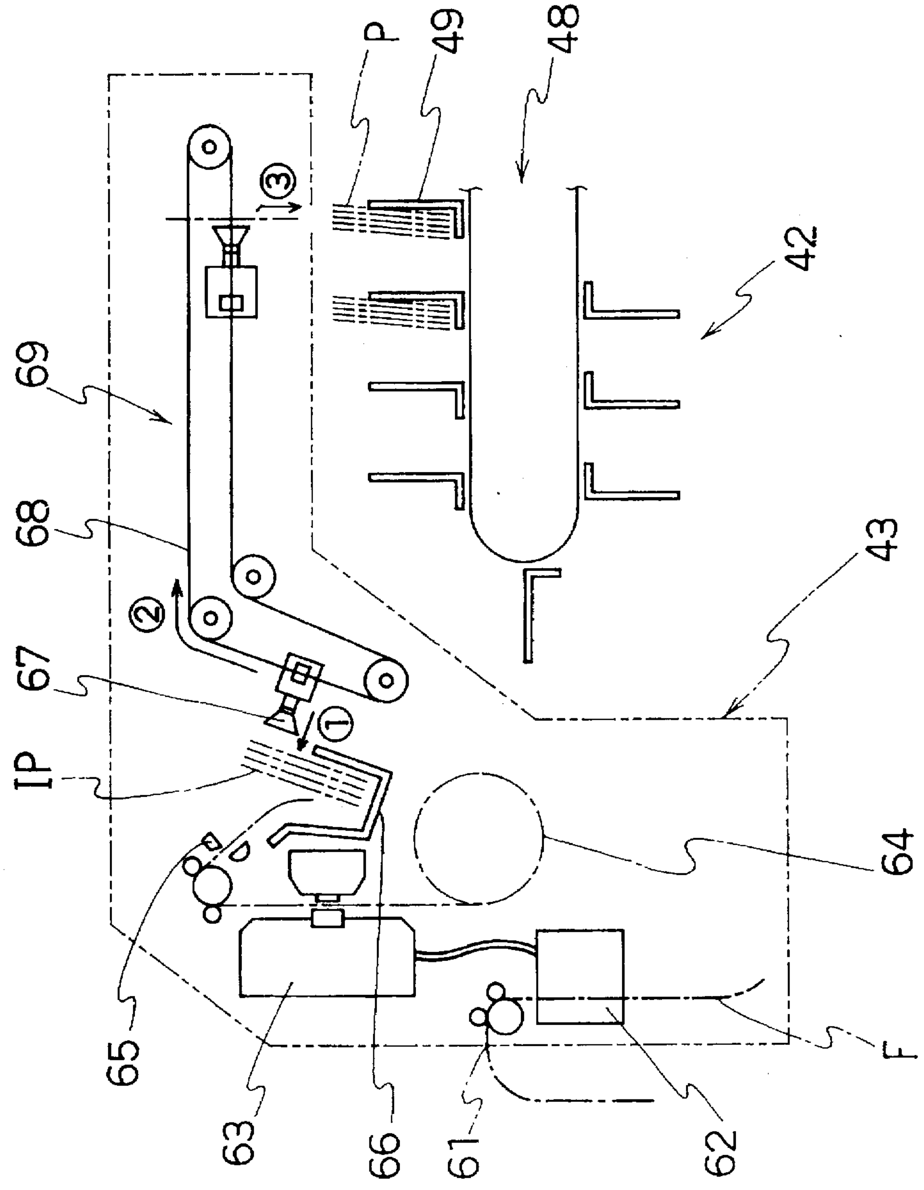
FIG. 5 is a structural explanatory view of one example of the index print preparation section and photo-printing and developing section of the photo-printing and developing apparatus shown in FIG. 4.

As shown in FIG. 5, the transportation means 69 takes out the index print IP one at a time in the order of storage in the storing section 66 by the suction mechanism 67 (operation ① in the drawing); transports it to the tray 49 of the order sorting section 48 by the transportation belt 68 driven by the motor (operation ② in the drawing); feeds the index print to the tray 49 by stopping suction of the sucking mechanism 67 (operation ③ in the drawing); and drives the motor again to return the sucking mechanism 67 to the home position by the transportation belt 68.

In the apparatus of Embodiment 7, the above-mentioned constitution is adopted, whereby dispensing with troublesome operation of the operator for collating the index print in addition to the conventional operation of matching the printed photographs sorted at the order sorting section 48 with the corresponding film and placing them into the DP bag.

Embodiment 8

In the photo-printing and developing apparatus, it is possible to modify the transportation means 69 shown in FIG. 5 to a means for selectively transporting the index prints to a plurality of trays 49 at the order sorting section 48.

For example, a transportation means 69 is disposed above the order sorting section 48 on which a plurality of trays are arranged in such a manner that the means 69 is in parallel to the tray 49. Stopping suction of the sucking mechanism 67 above the selected tray 49 enables the feed of the index print to the intended tray 49. Like in the case of Embodiment 7, the first storage means of the photo-printing and developing section 42 is connected to the second storage means of the index print preparation section 43 with the information transmission cord 55 and a plurality of order numbers of the printed photographs discharged and stored at the order sorting section 48 is transmitted from the first storage means to the second storage means. The second storage means collates the order number of the index print IP stored at the bottom of the storing section 66 with a plurality of order numbers transmitted from the first storage means, drives the transportation means 69 to the place with order number equal to the index print IP, and feeds the index print IP to the order sorting section 48.

In another modification, the position where the suction mechanism 67 stops suction is determined. A plurality of trays 49 mounted on the order sorting section 48 are circulatable and the tray to which the index print IP is fed can be selected by rotating the tray.

If the tray 49 can be selected in this way, even if the feed of the index print IP is slightly mixed up, it is possible to put the index print together with the printed photographs of the corresponding order number by controlling the transportation means 69 or the order sorting section 48.

Embodiment 9

Figure 6:
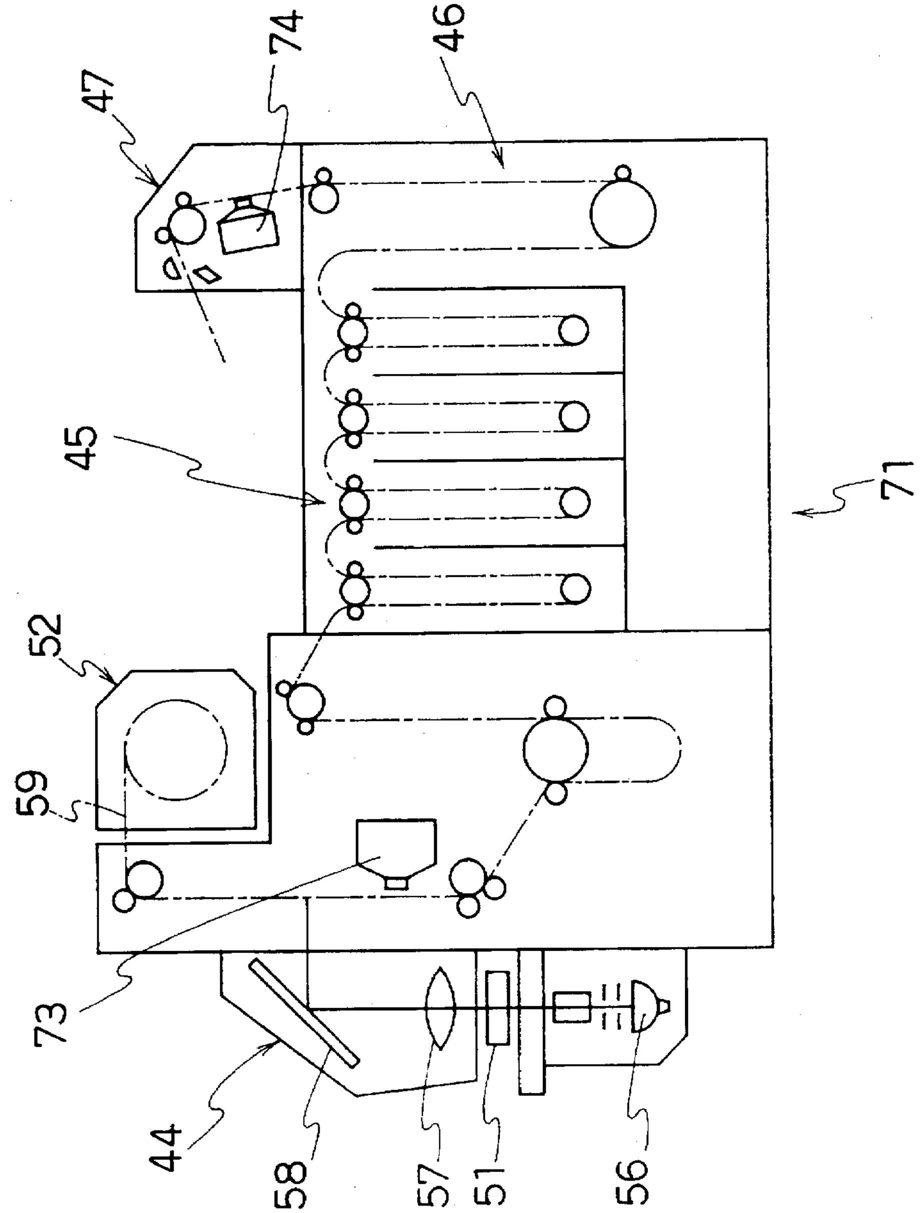
FIG. 6 is a structural explanatory view of one example of the photo-printing and processing section of the photo-printing and developing apparatus.
Figure 7:
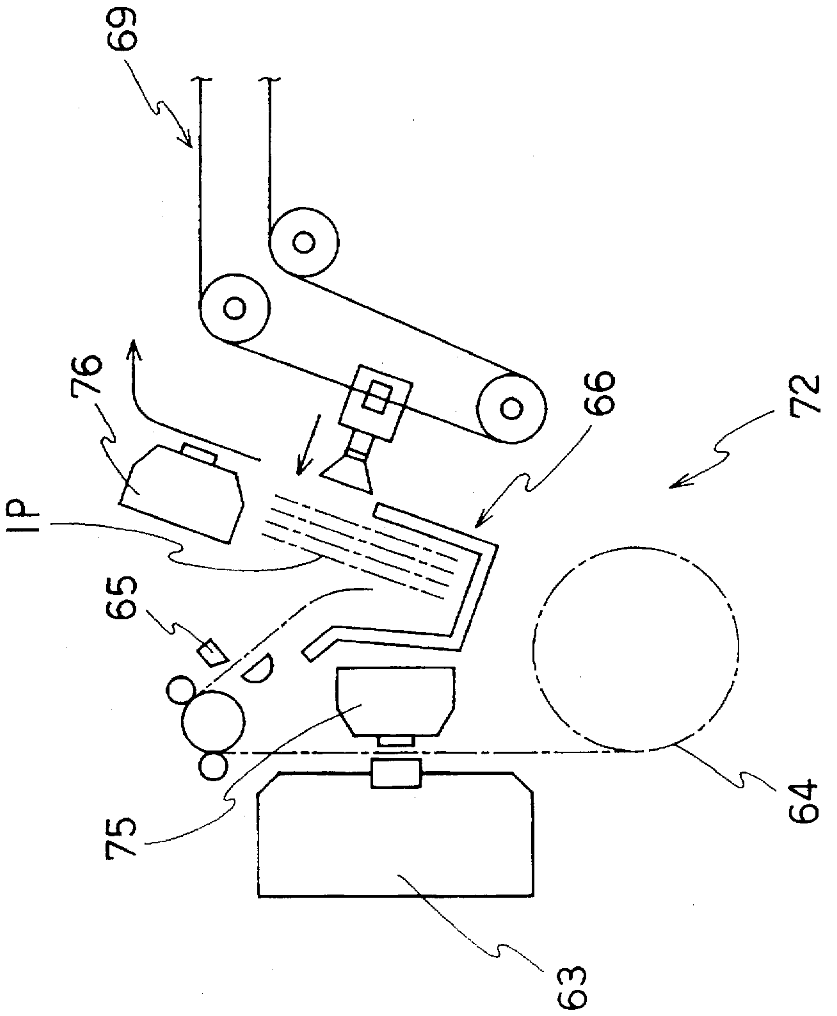
FIG. 7 is a structural explanatory view of a main portion of one example of the index print preparation section of the photo-printing and developing apparatus.

FIGS. 6 and 7 show a structural sectional view of one embodiment of a photo-printing and developing apparatus.

In the apparatus of Embodiments 7 and 8, collation is performed by storing in memory the entered information, but it is also possible to automatically collate the entered information by writing it in the printed photographs and index print and allowing the reader to read it just before they are sorted.

The appearance of the photo-printing and developing apparatus is the same as that of the photo-printing and developing apparatus 41 shown in FIG. 4. However, since the inside constitution differs from that, FIG. 6 shows the constitution of the photo-printing and developing section 71 and FIG. 7 shows the constitution of the main portion of the index print preparation section 72, respectively.

In FIG. 6, to the printing section 44 of the photo-printing and processing section 71, a light source 56, lens 57, and mirror 58 are built in. Frame images of the film set to the negative mask 51 are printed on the band-shape photographic paper 59 held in a roll-form in the paper magazine 52. The photographic paper 59 with images printed is discharged to the order sorting section 48 shown in FIG. 4 via the processing section 45, drying section 46, and paper cutting section 47.

This photo-printing and developing section 71 is equipped with the first recording means 73 and the first reading means 74 in addition to the keyboard 53 (refer to FIG. 4). The first recording means 73 is provided to the printing section 44 and the order number is printed on the rear surface of the printed photographs. The-order number is printed in a bar code and automatically read by the first reading means 74. The first reading means 74 is preferably disposed inside the paper cutting section 47 provided near the order sorting section 48.

In FIG. 7, the image of the film read by the scanner 62 (refer to FIG. 5) is printed on the roll paper 64 by the print head 63. The printed index print IP is cut into a specified size by the paper cutter 65, and temporarily stored in a box-shape storing section 66. The transportation means 69 transports the index print IP to the order sorting section 48 of the photo-printing and developing section 42 one at a time.

This index print preparation section 72 is equipped with the second recording means 75 and the second reading means 76 in addition to the keyboard 54 (refer to FIG. 4). The second recording means 75 is disposed at a position opposite to the print head 63 with the roll paper 64 positioned therebetween, and prints the order number on the rear surface of the index print IP. The order number is printed by a bar code and automatically read by the second reading means 76. The second reading means 76 is disposed in such a position that the order number written on the rear surface of the index print IP taken out from the storing section 66 by the suction mechanism 67 can be read.

In the photo-printing and developing apparatus of Embodiment 9, like in the apparatus of Embodiments 7 and 8, the operator enters the order number affixed to the film by the keyboard 53 when printing takes place at the photo-printing and developing section 71. The entered order number is recorded on the rear surface of the band-shape photographic paper 59 by the first recording means 73.

Then, the operator inserts the printed film into the index print preparation section 72 and enters the same order number as that entered at the photo-printing and developing section 71 by the keyboard 54. The entered order number is recorded on the rear surface of the index print by the second recording means 75.

The photo-printing and developing section 71 develops the photographic paper 59 with frame images printed, and cuts at the paper cutting section 47 one frame at a time. On the rear surface of the printed photograph prepared in this way, a bar code is printed, and the first reading means 74 reads the order number from this bar code. In this way, the order number of the printed photographs to be sorted at the order sorting section is stored in memory.

The index print preparation section 72 takes out the index print IP stored in the storing section 66 in the order of printing one at a time by the suction mechanism 67. The order number of the index print IP taken out is confirmed by the second reading means 76.

If the order number confirmed by the second reading means 76 in this way is equal to the order number stored in memory by the first reading means 74, the index print sucked by the suction mechanism 67 is fed to the order sorting section 48.

If the order number confirmed by the second reading means 76 differs from the order number stored in memory by the first reading means 74, an alarm is issued or displayed to notify the operator.

Embodiment 10

In also the photo-printing and developing apparatus of the present invention according to Embodiment 9, like in Embodiment 8, it possible to modify the transportation means 69 shown FIG. 5 to a means for selecting a plurality of trays 49 of the order sorting section 48 and transporting the index print. In such case, the transportation means 69 or the order sorting section 48 are designed to have the same constitution as in the case of Embodiment 8.

The first reading means 74 of Embodiment 10 stores in memory in which tray of the order sorting section 48 the order number of the specific printed photograph P is held. It determines as to whether there exists any order number equal to that read by the second reading means 76 or not, and if it exists, the first reading means 74 judges in which tray it exists, and drives the transportation means 69 to transport and feed the index print IP to the tray 49 in which the corresponding printed photograph is held. If there is no order number, an alarm is issued or displayed to notify the operator.

Embodiment 11

In Embodiments 9 and 10, the first recording means 73 and the second recording means 75 are means for writing bar codes, and enables full automatization.

However, the first recording means 7 and the second recording means 75 in the photo-printing and developing apparatus of the present invention might be a means for printing simple marks such as Arabic numerals, symbols and characters.

In such case, the operator visually collates the printed marks. Even if there are similar photographs, the marks printed on the rear surface thereof can be easily identified so that printed photographs can be sorted without fail.

Embodiment 12

In the foregoing embodiments, as a mechanism for automatically reading the order number, there are some embodiments which use a bar code reader, but this is only an example used for explanation and there are many other methods such as using magnetic information or detecting the mark position.

Embodiment 13

Figure 8:
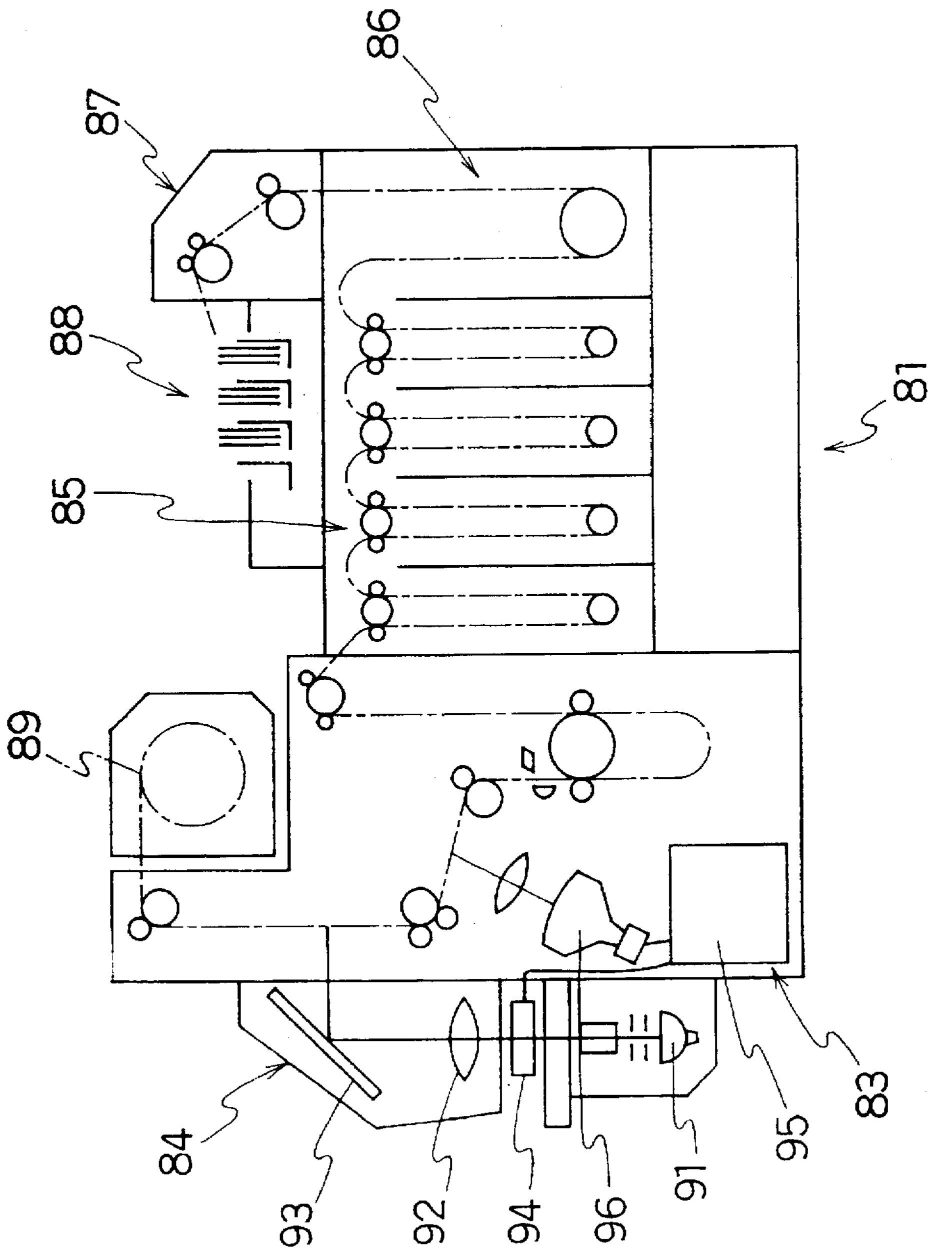
FIG. 8 is a structural explanatory view of one embodiment of a photo-printing and developing apparatus.

FIG. 8 shows a structural explanatory view of one embodiment of a photo-printing and developing apparatus.

The photo-printing and developing apparatus 81 incorporates an index print printing means 83 into an apparatus for carrying out printing and processing of photographs. This index print printing means 83 is of a digital system, which stores in memory the images read by a scanner 94 in a control mechanism 95 and edits and prints them in one printed photograph.

In FIG. 8, the photo-printing and developing apparatus 81 comprises a printing section 84, a developing section 85, a drying section 86, a paper cutting section 87, and an order sorting section 88. The printing section 84 incorporates thereinto a light source 91, a lens 92, and a mirror 93, and the index print printing means 83 comprises a scanner 94, a control mechanism 95, and CRT 96. Numeral 89 is a roll-form photographic paper.

In this photo-printing and developing apparatus 81, the index print preparation operation takes place in the following manner.

First of all, the negative image information is read by the scanner 94 in accordance with the order and processed, and after the negative is transported to the printing position, correction control of, for example, color tone of printing light is carried out, and the image of each frame is printed successively on the photographic paper 89.

At the index print printing means 83, the image information of the negative for each order read by the scanner 94 is transmitted to the control mechanism 95 and is stored in memory. On the other hand, at the printing section 84, after the last frame of the order is printed, a portion not printed is provided as a screen for the index print, and after the portion, printing of the next order is carried out.

CRT 96 is provided after the printing section 84, and when the portion with no frame image printed for the index print reaches the printing position for CRT 96, the screen information stored and edited in the control mechanism 95 is printed.

The photographic paper 89 to which frame images and index are printed goes past the developing section 85, drying section 86, and paper cutting section 87, and is discharged to the order sorting section 88 in accordance with the order. In such case, because the index print is printed after the last printed photograph for each order and discharged successively, automatic collation takes place at the order sorting section 88.

At the photo-printing and developing apparatus 81 of Embodiment 13, because collation operation automatically takes place, there is no error in collation and the work efficiency improves. Since the index print printing operation is included in the printing process of the photographs, operation such as transportation of the negative can be reduced, thereby further improving the work efficiency.

Embodiment 14

The digital system index printing means 83 of Embodiment 13 is designed to use CRT, but in the present invention, it is not limited to this but the present invention can be embodied in the systems using LCD, LED, or laser.

Embodiment 15

Figure 9:
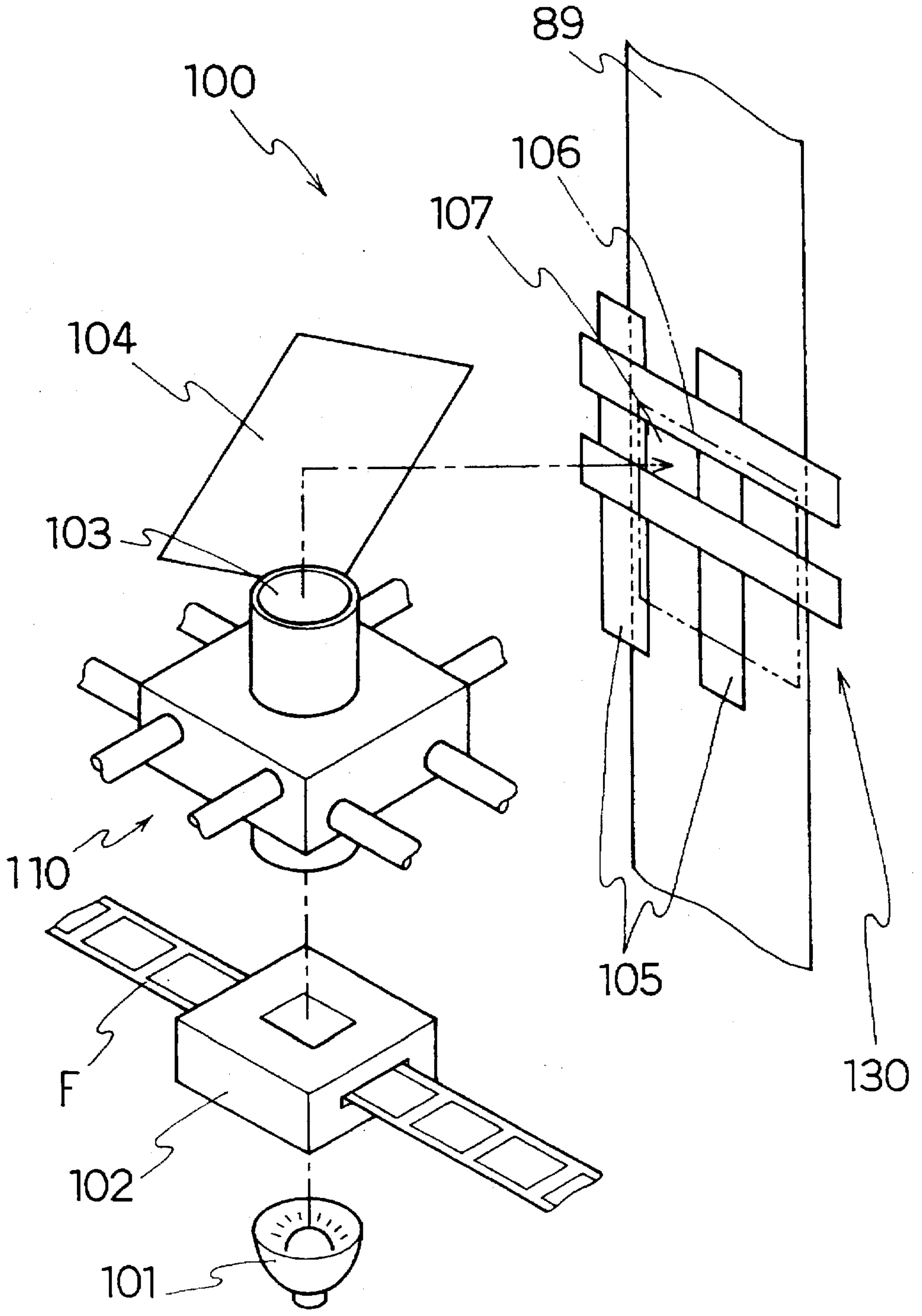
FIG. 9 is a structural explanatory view of one example of an index print printing means of a photo-printing and developing apparatus.

FIG. 9 shows a structural explanatory view of one embodiment of a photo-printing and developing apparatus.

The index print printing means 100 is housed in the photo-printing and developing apparatus in FIG. 8. It is located after the printing sect ion 84 and before the developing section 85 as in the case of the index print printing means 83 of Embodiment 13. The index print printing means 100 might be assembled in the printing section 84 of FIG. 8. Now, explanation will be made on the position when it is located before the developing section 85.

In FIG. 9, the index print printing means 100 comprises a light source 10 1, a negative mask 102, a printing lens 103, a mirror 104, and four pieces of band-shape paper mask 105, and prints frame images of one order successively on the index print screen 106 shown with an alternate long and two short dashes line. Film F is inserted into the negative mask 102 again after the last frame of one order is printed at the printing section 84, and is transported from the first frame of the order successively to the printing position.

The index print printing means 100 is equipped with a printing lens moving mechanism 110 for moving the printing lens in the plane for successively printing frame images of one order on the index print screen 106 and a paper mask moving mechanism 130 for shielding light at an optional position on the screen 106.

Figure 10:
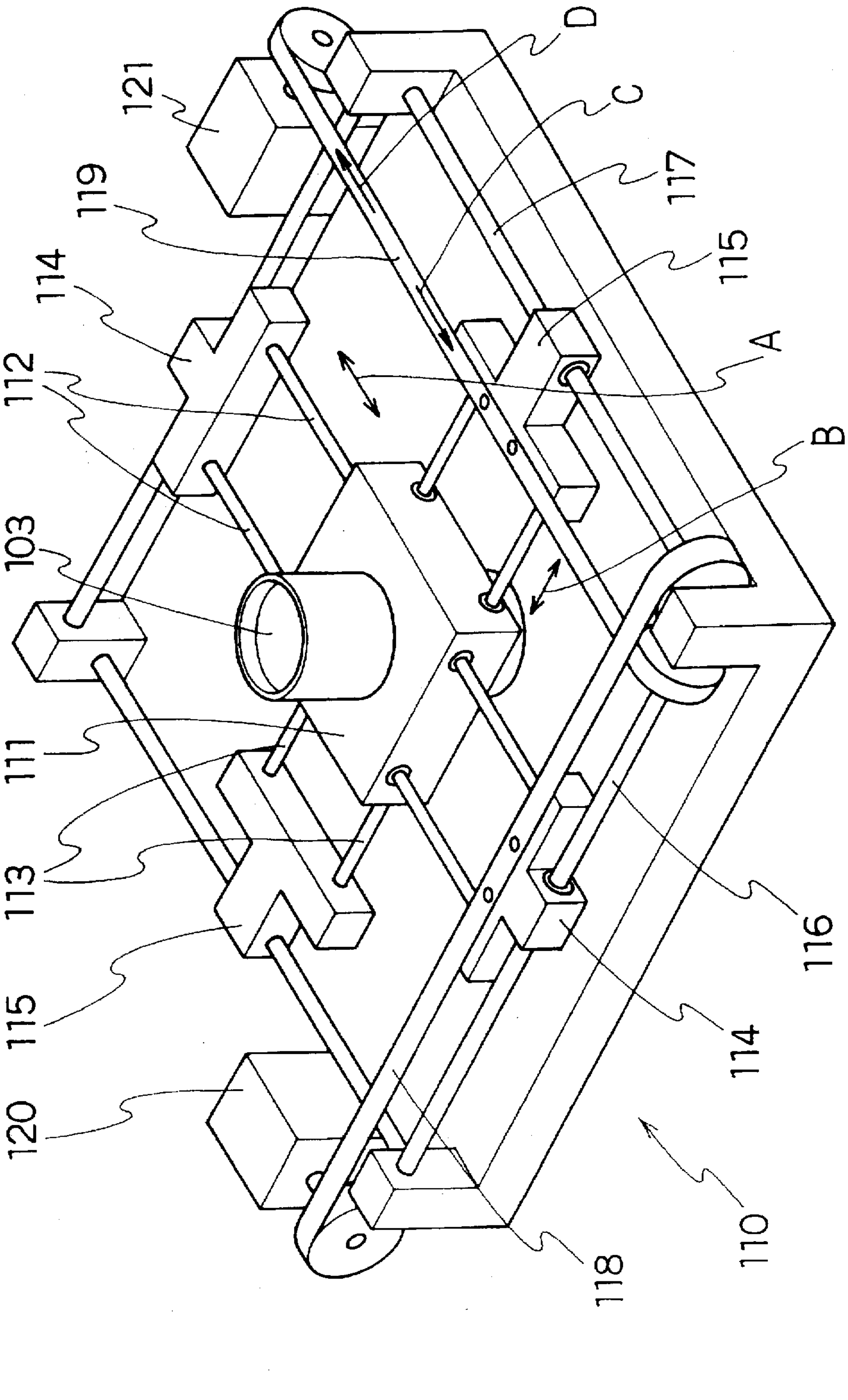
FIG. 10 is a perspective explanatory view of one example of a printing lens moving mechanism of the index print printing means of FIG. 9.

In FIG. 10, the printing lens moving mechanism 110 comprises a rectangular lens plate 111 for holding the printing lens 103; two first slide shafts 112 for slidably supporting the lens plate 111 in the longitudinal direction (arrow A direction) and two second slide shafts 113 for slidably supporting the lens plate 111 in the lateral direction (arrow B direction); slides 114, 115 provided at both ends of the first slide shaft 112 and the second slide shaft 113; guide shafts 116, 117 for guiding the slides 114, 115; belts 118, 119 fixed to the slides 114, 115; and motors 120, 121 for rotating the belts 118, 119.

When the lens plate 111 is slid in the longitudinal direction (arrow A direction), the motor is driven and the belt 119 is rotated in either arrow C or D direction. To the belt 119, the slide 115 is fixed and moves in the longitudinal direction as the belt 119 rotates. Because the slide 115 supports the slide shaft 113 and the slide shaft 113, in turn, supports the lens plate 111, the lens plate 111 moves in the longitudinal direction as the slide 115 moves. This applies to the case when it moves in the lateral direction (arrow B direction).

In FIG. 9, the paper mask moving mechanism 130 moves four pieces of band-shape paper mask 105 to shield light at the optional position of the photographic paper 89, and forms a portion 107 to be printed. The motion of the four paper masks 105 is controlled by the control mechanism.

Figure 11:
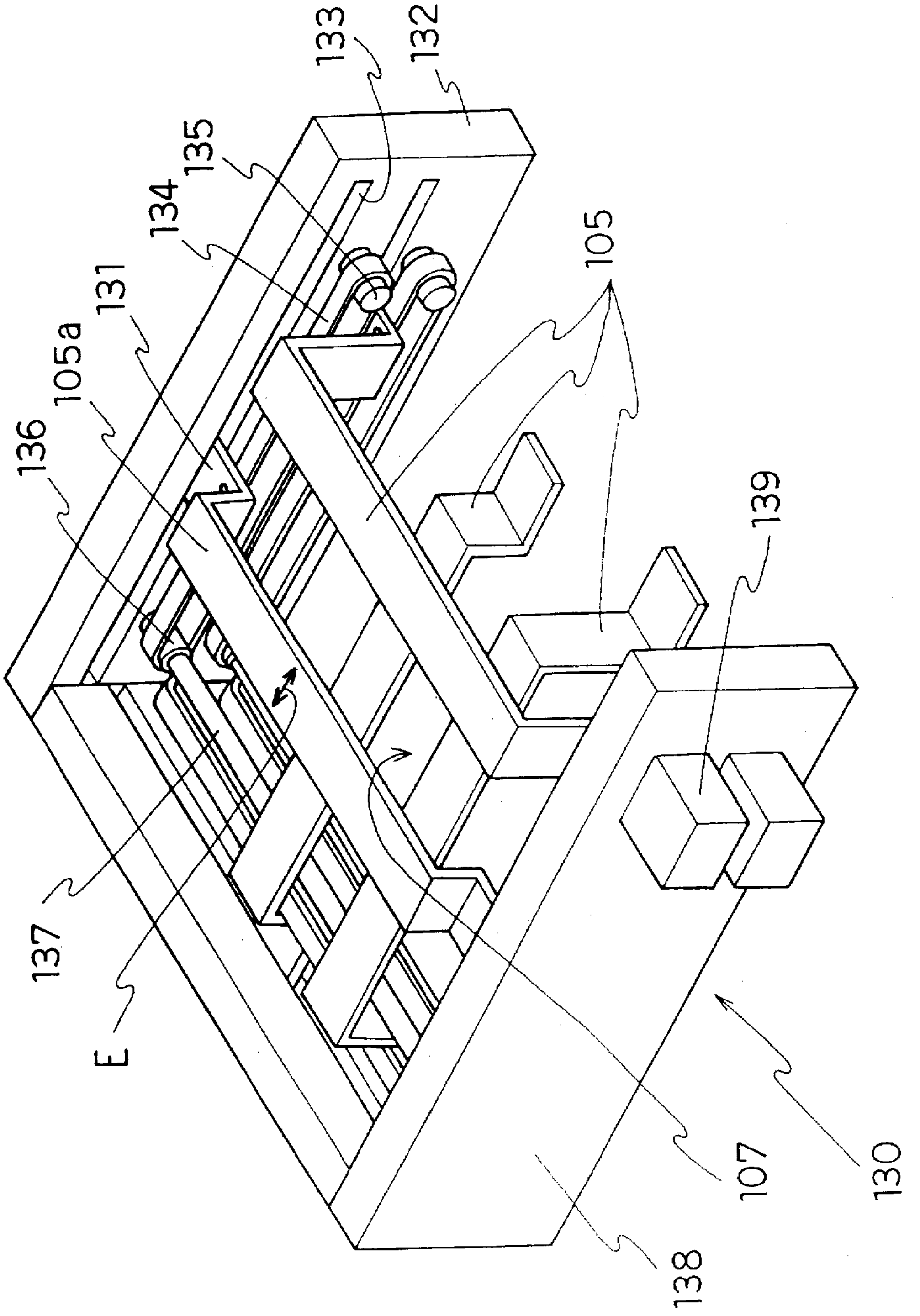
FIG. 11 is a perspective explanatory view of one example of a paper mask moving mechanism of the index print printing means of FIG. 9.

In FIG. 11, referring to one paper mask 105*a* as an example, the mechanism and the operation of the paper mask are explained.

Both ends 131 of the paper mask 105a are bent and slidably inserted into grooves 133 formed in frames 132 and 138 and supported. Both ends 131 are also linked to the belt 134. The belt 134 is wrapped around the pulleys 135, 136, and the pulley 136 is connected to the opposite pulley (not shown) by the coupling shaft 137. The frame 138 is provided with a belt and a groove as in the case of the opposite frame 132, but the pulley at one end is connected to the motor 139. When the motor 139 is driven, the power is transmitted from the pulley connected to the motor to the belt, coupling shaft 137, pulley 136, and belt 134, enabling the paper mask 105*a* to be freely moved in the arrow E direction by varying the direction of rotation of the motor 139.

Next, referring to FIG. 9, the motion of the index print printing means 100 of this embodiment is explained. The operator inserts the film F finished with printing for printed photographs into the negative mask 102 for preparing an index print. The inserted film F is transported successively frame by frame. The printing lens 103 can be moved freely in longitudinal and lateral plane direction of the negative by the printing lens moving mechanism 110, and moves in such a manner that the screen of each frame is located at the position in accordance with the order of printing on the index print screen 106. The paper mask 105 is designed to move freely in longitudinal and lateral plane direction of the photographic paper (paper) 89 by the paper mask moving mechanism 130 and moves in such a manner that it shields light to the portion other than the frame printed portion 107 in accordance with the order of printing on the index print screen 106.

By being controlled in this way, index print is printed after the photograph of each frame for one order and successively developed, and collation of the index print at the order sorting section is automatically taken place.

Because collation work of the index print and the printed photographs is automatically carried out in the apparatus of Embodiment 15 in the same manner as in the case of the apparatus of Embodiments 13 and 14, no collation error occurs and the work efficiency improves.

Embodiment 16

For the index print printing means 100 of Embodiment 15, the printing lens exchanging mechanism might be used in place of the printing lens moving mechanism 110.

Figure 12:
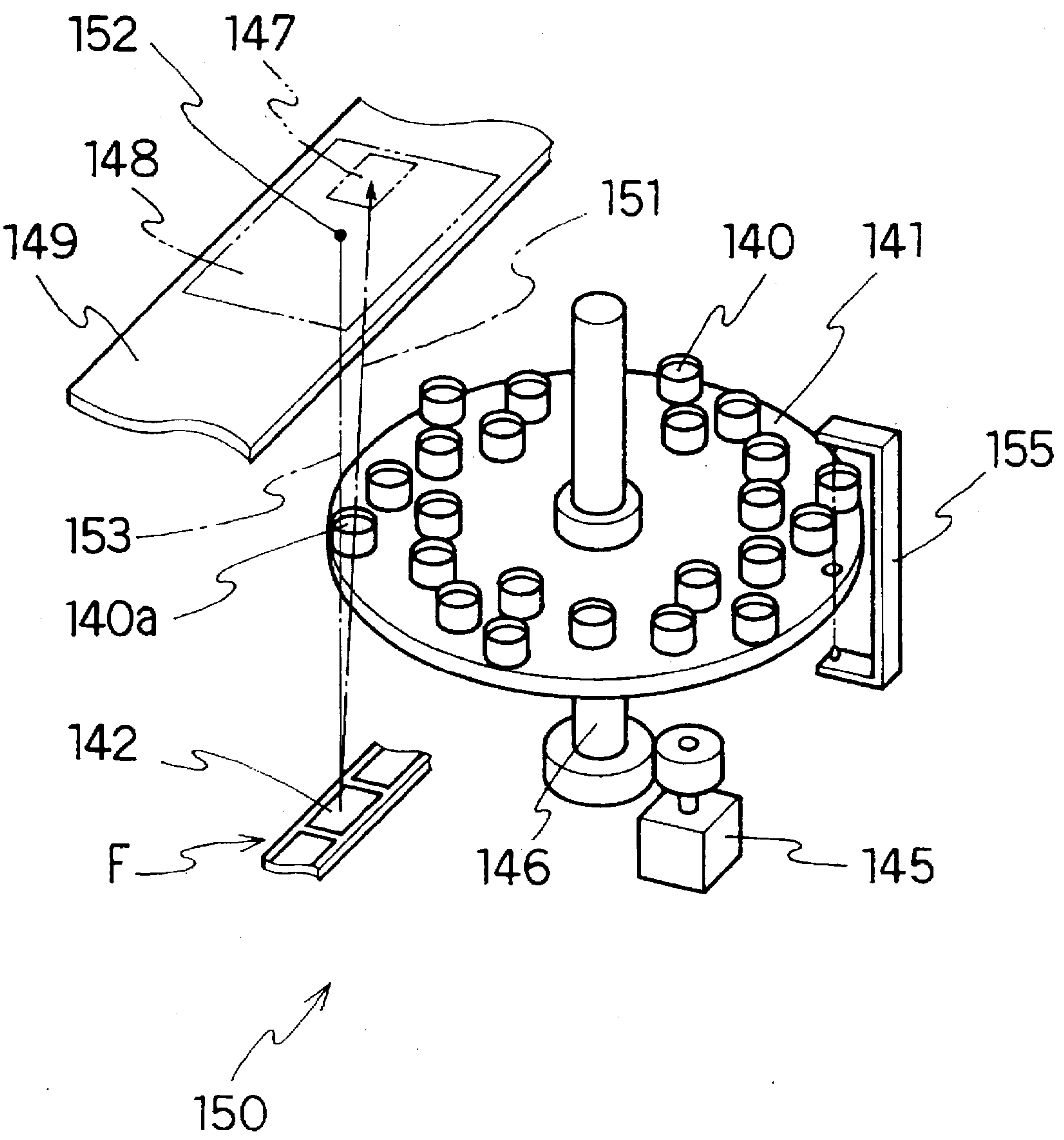
FIG. 12 is a structural explanatory view of one example of a printing lens exchanging mechanism of a photo-printing and developing apparatus.

The printing lens exchanging mechanism 150, as shown in FIG. 12, comprises a rotatable disk 141 and a printing lens 140 for each frame mounted on the rotatable disk 141. The frame image 142 of film F is successively printed on the index print screen 148 of the paper 149 through the printing lens 140*a*. Numeral 147 denotes each frame screen.

The disk 141 rotates around the disk supporting shaft 146 by the drive motor 145 and exchanges the printing lens for every frame. The optical axis 151 passing through the printing lens 140 deviates from the optical axis center 153 passing the screen center 152, each forming a frame screen 147 at the specified position on the index print screen 148. The printing lenses 140 are arranged on the disk 141 so that frame screens 147 can be arranged in the order of the frame number.

Figure 13A:
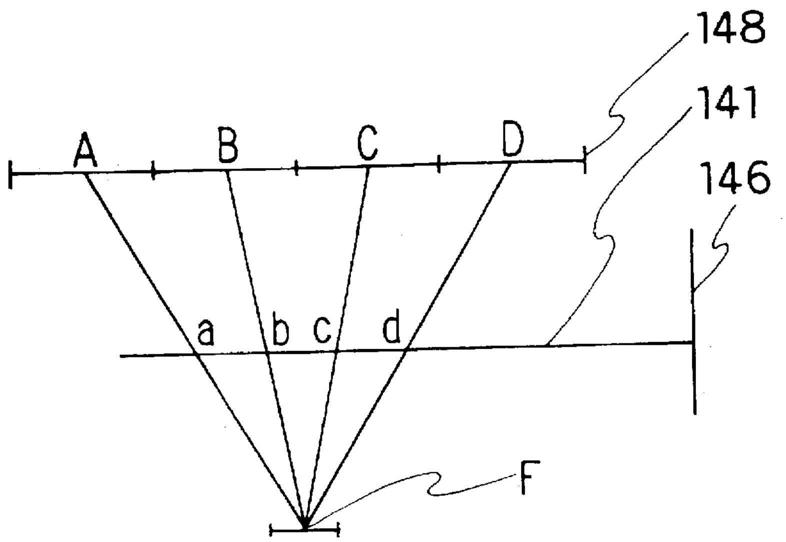
FIGS. 13(*a*) and 13(*b*) are explantory views showing the positional relationship between the printing lens of the printing lens exchanging mechanism of FIG. 12 and the index print screen.
Figure 13B:
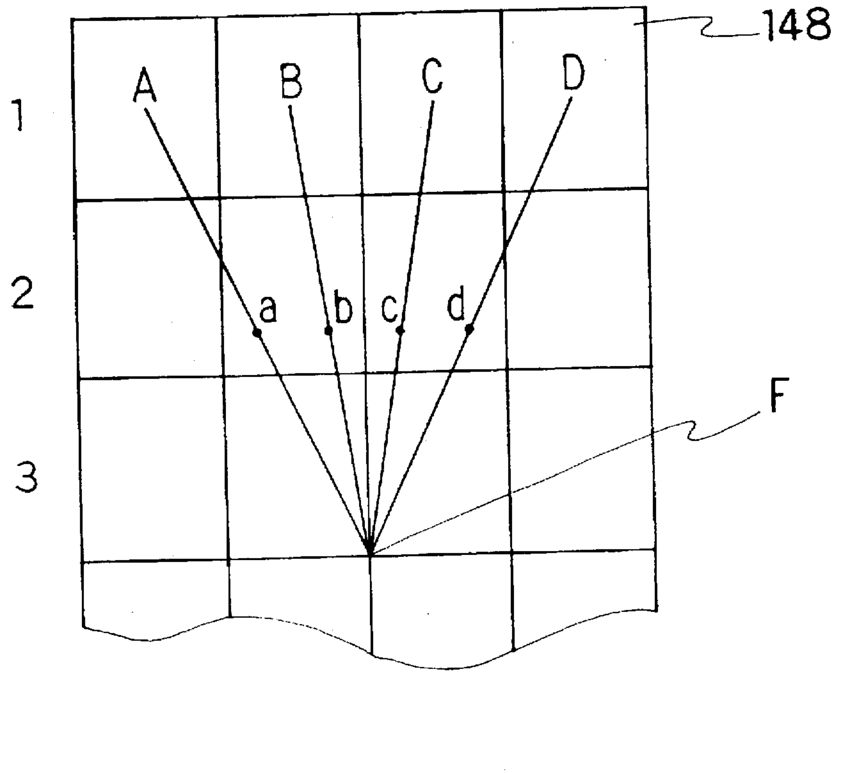
Figure 14A:
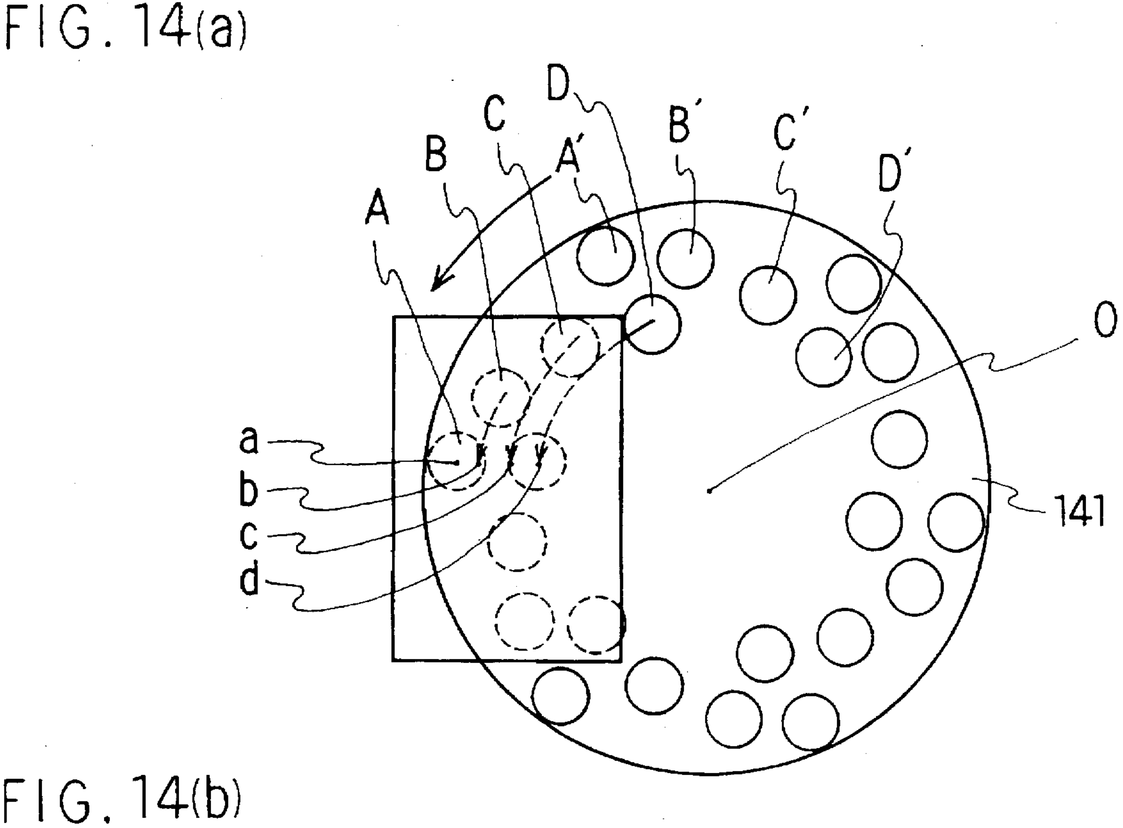
FIGS. 14(*a*) and 14(*b*) are explanatory views showing the arrangement of the printing lens of the printing lens exchanging mechanism of FIG. 12.
Figure 14B:
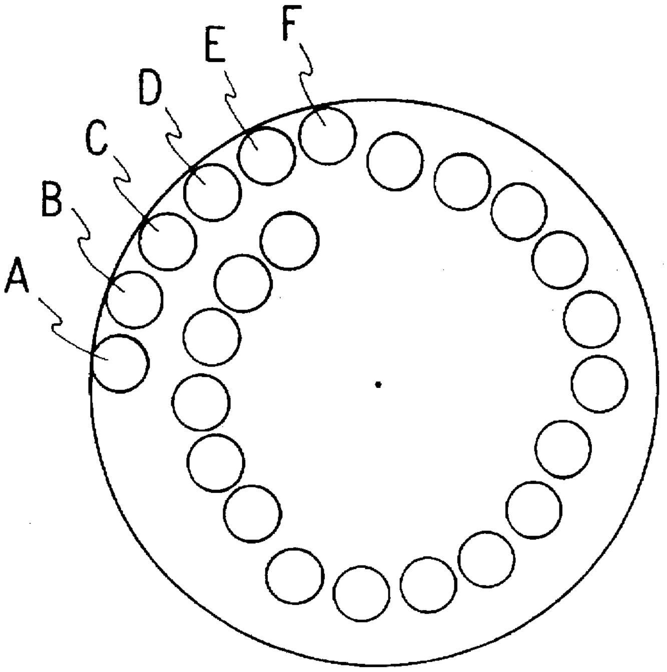

FIG. 13 shows the positional relationship between the printing lens and the index print screen wherein FIG. 13(*a*) illustrates the side and (*b*) the plane. FIG. 14 shows the arrangement of the printing lenses on the disk 141.

As shown in FIG. 13(*a*), when the light penetrating the film F reaches the index print screen 148, printing lenses a, b, c, and d must be arranged on the optical paths (light reaches uniformly since a mirror tunnel (diffusion chamber) is located from the light source to the film F). However, fixed location of the printing lenses a, b, c, and d is difficult due to the size of the printing lenses and the space allowed, and therefore, the printing lenses are designed to be movable so that they might be arranged at a required place.

FIG. 14(*a*) indicates the case when the index print screen is formed by 4×6 frames and FIG. 14(*b*) the case of 6×4 frames.

FIG. 14(*a*) indicates the case in which four printing lenses A, B, C, and D with different distance from the rotation center O are formed in one set and a total of 6 sets (4×6) of lenses are arranged on the disk 141. After lens A prints at the position a (position a in FIG. 13 as seen from the side), the disk 141 rotates in the arrow direction and set lens B at the position b (corresponds to b in FIG. 13). In this way, after printing of frame images on the first column is successively carried out at positions a, b, c, and d, printing on the second coin is carried out at printing lenses A', B', C', and D'.

FIG. 14(*b*) indicates the case which six printing lenses A, B, C, D, E and F are formed in one set and a total of 4 sets (6×4) of lenses are arranged on the disk.

For a method to control the magnitude of rotation of the disk 141, conventionally well-known methods such as that using a positioning sensor 155 (a hole is provided in the disk for detection), that adopting a pulse motor for a drive motor (that controlling the magnitude of rotation by the number of pulses), and the like can be used.

Furthermore, using only four printing lenses A, B, C, and D in FIG. 14(*a*), the printing position of the screen with respect to the width direction (perpendicular to the paper transporting direction) of the paper 149 in FIG. 12 is changed. The change of the printing position of the screen with respect to the paper transporting direction is controlled by transporting the paper by one screen (equivalent to one column in FIG. 13(*b*)). It is easily assumed that the number of printing lenses can be reduced by the foregoing arrangement.

Embodiment 17

In Embodiments 13, 14, and 15, there have been explained the cases when screens are printed on a band-form photographic paper (paper) held in a roll form, but the present invention is not limited thereto but can be applied to the apparatus which prints screens on a sheet-form photographic paper (paper).

Embodiment 18

Next, explanation will be made on the information card of the present invention and various types of apparatus and methods using the information card.

Figure 15:
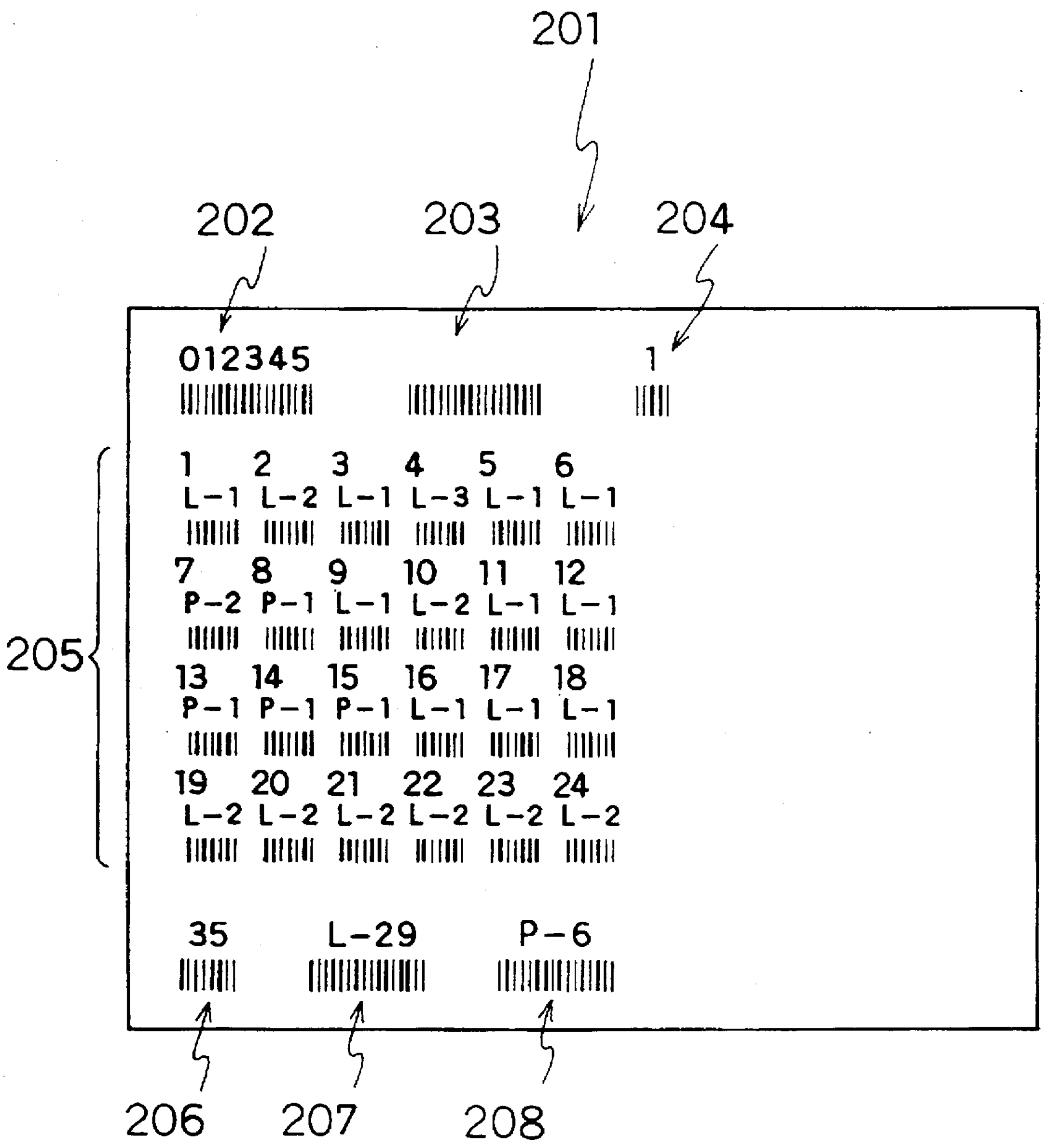
FIG. 15 is an explanatory view showing one embodiment of an information card.

FIG. 15 is an explanatory view showing one embodiment of an information card. The information card of the present invention records information required for calculating price for each order and/or printing conditions at the time of printing and developing in a form of a card, and one or more pieces of information card are prepared for one order. The information recorded in the information card is mechanically read, and calculation and display of the price or decision of the reprint printing conditions are automatically carried out. Consequently, in the example shown in FIG. 15, the information is recorded with the bar code which can be optically read but other information recording means such as magnetic recording might be used. Hereinafter, in this embodiment, the information card using the bar code will be explained as an example.

The information card has the information recorded on its surface or both front and rear surfaces of regular paper, or photographic paper like in the case of photo prints, or plastic sheets. In the present specification, the card which only records the information is particularly called an information dedicated card. In addition to this, it is also possible to record the information on the rear surface or the front surface (image forming surface) of the corresponding index print or on the rear surface of the regular photo prints. In such case, the index print and the photo print with the information recorded are also called the information card. Needless to say, the information dedicated card might be affixed to the rear surface of the index print, or photo print, or to the film storing bag or DP bag.

The information card 201 shown in FIG. 15 has the information required for price calculation, and FIG. 15 shows one side of the information dedicated card or a rear side of the index print or photo print. Each piece of information is written in both kana or alphanumerical characters and bar code.

In FIG. 15, numeral 202 on the top column indicates the order number, 203 the store name, 204 the presence of film development wherein (1) with development and (0) without development. Numeral 205 on the middle column is the information related to each frame, and below the number coinciding with the number stamped on the negative film, alphabets (L), (P) showing the print size and the number of required printing are recorded. In addition, on the bottom column, the total number of the printed photographs 206, the total number of prints by each size 207, 208 are recorded.

Not limited to the example shown in FIG. 15, price calculation and display can be automatized by the methods of ① designating ID number or the record of the customer name to order information (order number); ② designating the record on each pickup and delivery route and store code to the information for calculating prices (price classification information); ③ though the film developing charges and charges per print are calculated from the number of frames for each order and presence of film development in the foregoing information, directly recording the film development charges and total print charges; and ④ collating with the information stored beforehand in the display and calculating equipment by recording symbols, not the amount, and reading the symbols.

The printing conditions at the time of printing and developing are information for unifying size and quality such as color tone at the time of reprinting with those of the printing and developing, and might include printing corrections (Y, M, C, D) for each frame, machine model, light source correction (sun rays, mercury lamp and the like) and the like.

Figure 16:
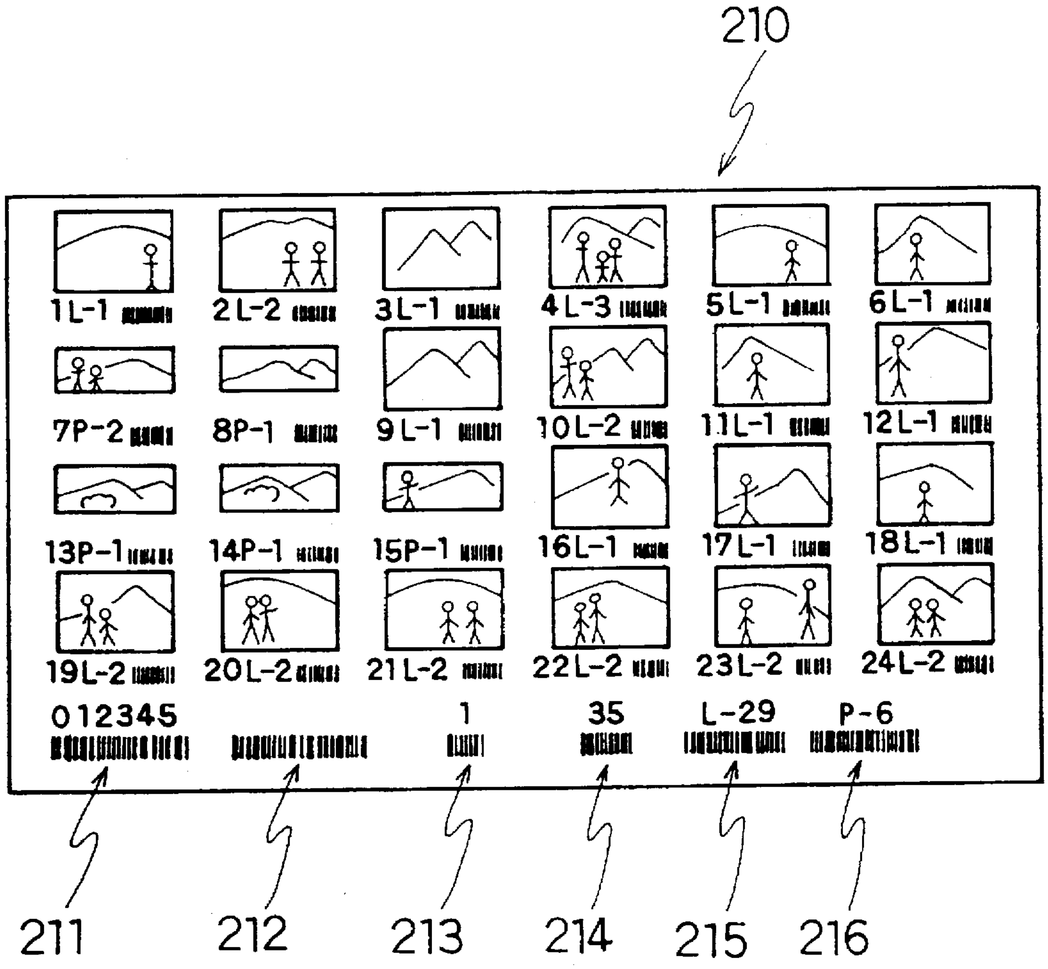
FIG. 16 is an explanatory view showing another embodiment of the information card.

The information card 210 shown in FIG. 16 has the information required for price calculation recorded like in the information card 201 shown in FIG. 15, but in particular, the information is recorded on the image forming surface of the index print.

In FIG. 16, at the lower part of each frame, the print size and the number of required prints are displayed and at the bottom column, order number 211, store name 212, presence of film development 213, the total number of prints 214, and the total number of prints by size 215, 216 are recorded.

In the present invention, if the index print is used for the information card, the information card can be prepared by adding the information take-in means and the information recording means to the conventional index print preparation apparatus.

If the information shown in FIG. 15 is recorded on the rear surface of the index print, it is possible to check the whole order simultaneously at a glance at the time of price calculation by looking at the surface of the index print, collating the film, regular prints, and the DP bag, and calculating the price based on the information on the rear surface. At the time of reprinting, ordering by the use of the index print enables checking or determining the printing conditions simultaneously with checking the film frame number, thereby simplifying the operation process.

As shown in FIG. 16, if the information is recorded on the image forming surface of the index print, only looking at one side of the print is enough and no procedure for turning over the print or looking at the front is required, thereby further simplifying the operation process.

Next explanation will be made on the information card preparation apparatus of the present invention.

In the information card preparation apparatus of the present invention, the preparation method and apparatus constitution are determined in accordance with the type of the information card to be prepared. However, in either case, it is equipped with a means for taking in the information from the photo-printing apparatus and a means for recording the information taken in.

In the apparatus for preparing the information dedicated card, it is possible to design the information card preparation apparatus by installing the information take-in means to the equipment comprising a bar code writer or dot printer as a recording means which can print bar codes, alphanumerical characters, kana, and the like on a regular paper.

For the apparatus for utilizing the index print or regular photo prints and recording the information on their rear surfaces, the same configuration as that of the apparatus for preparing the information dedicated cards can be adopted, and in such case, index prints or photo prints should be used for the paper inserted in the apparatus.

In addition, in the information card preparation apparatus for recording the information on the front or rear surface of the index print, the information card can easily be prepared by providing the take-in means and the recording means to the index print preparation apparatus (index print preparation section if it is contained in the photo-printing apparatus).

Figure 17:
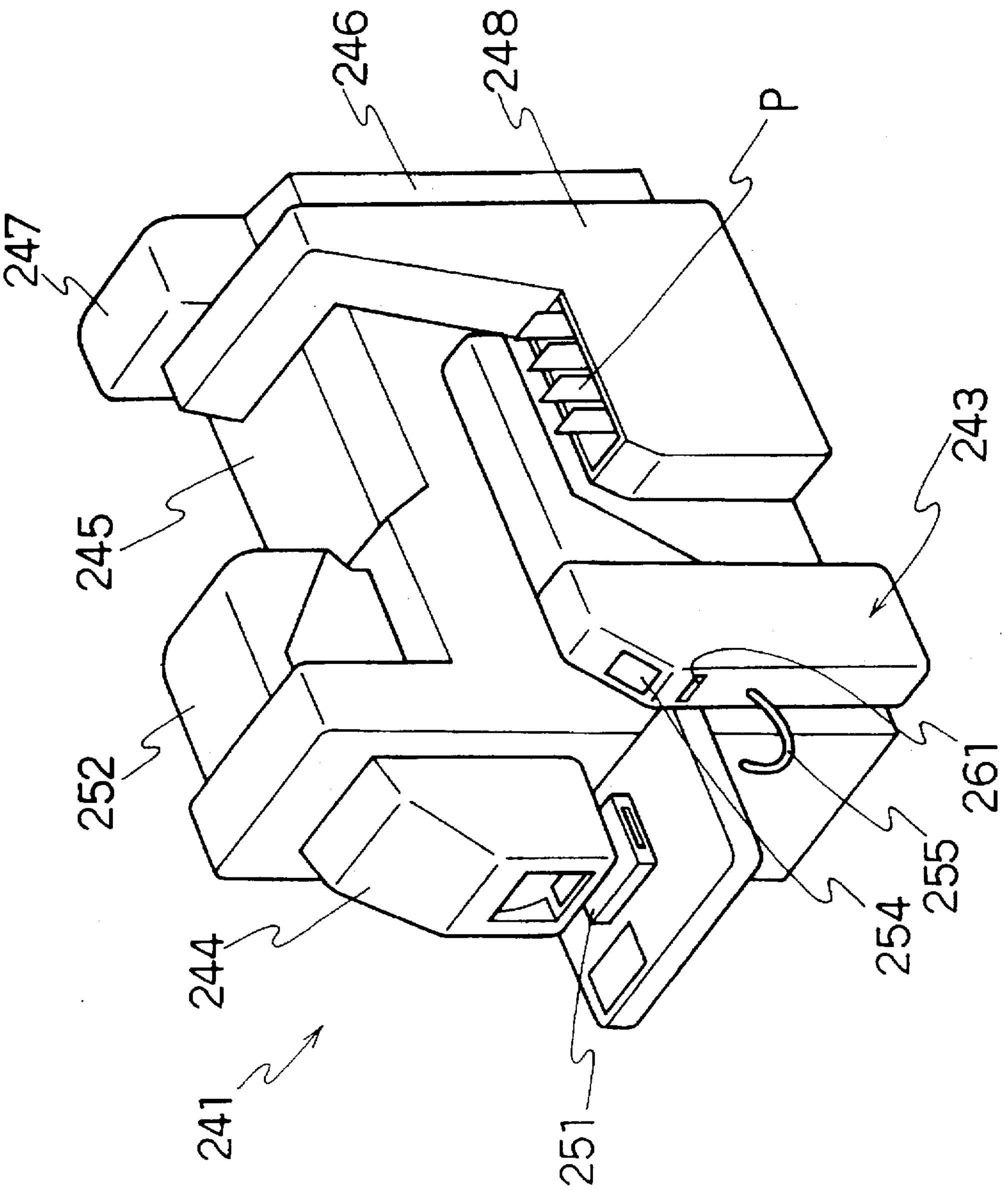
FIG. 17 is a perspective explanatory view showing one embodiment of a information card preparation apparatus.
Figure 18:
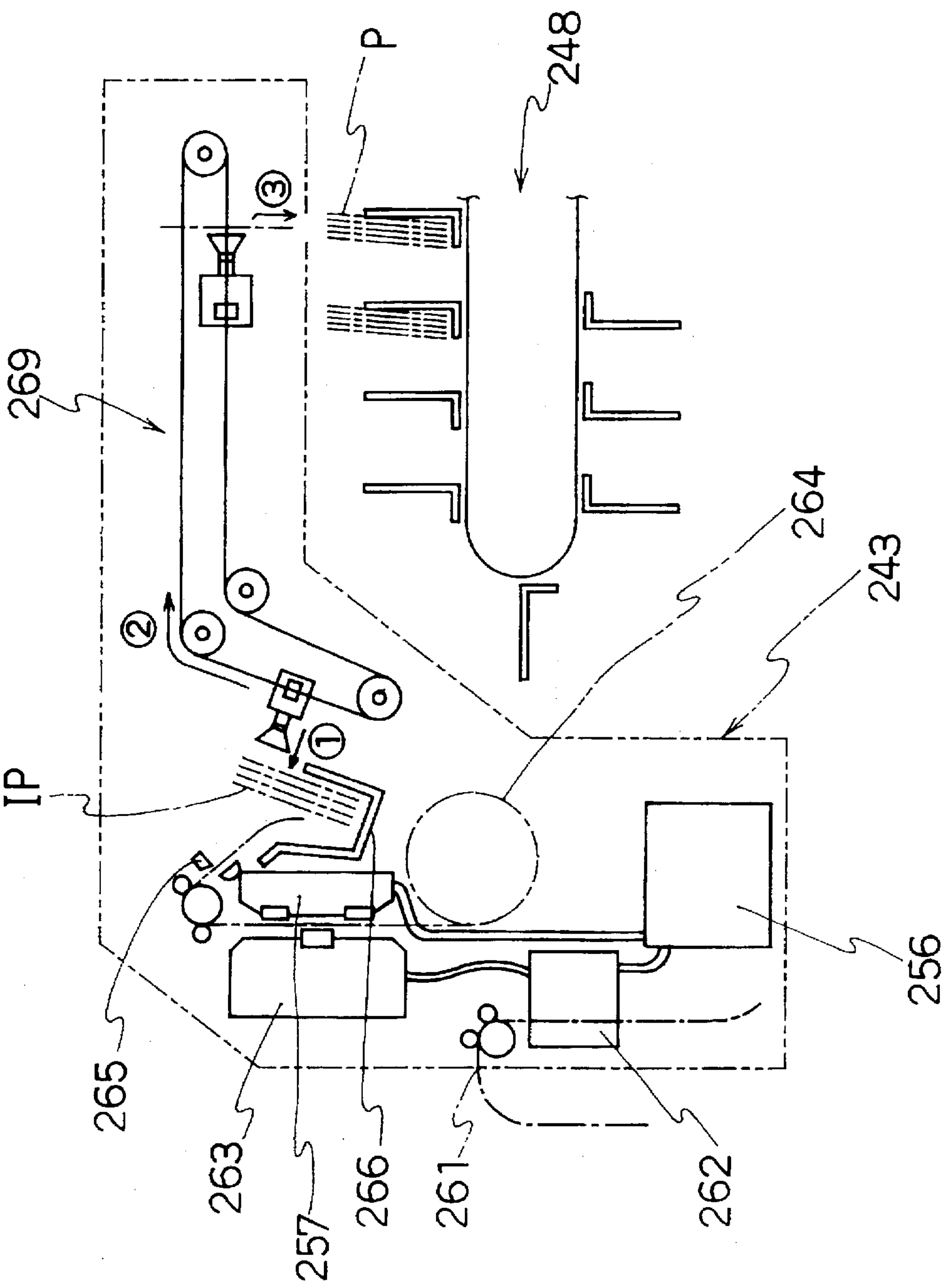
FIG. 18 is an explanatory view of the internal constitution of the information card preparation apparatus of FIG. 17.

Now referring to FIG. 17 and FIG. 18, one embodiment of the information card preparation apparatus which is equipped with the index print preparation means and can record the information on the rear surface of the index print.

The information card preparation apparatus 243 of FIG. 17 is equipped with an index print preparation means. This apparatus 243 is placed beside the photo-printing and developing apparatus 241. Consequently, it is possible to immediately insert the film inserted into the negative mask 251 to be finished with printing of the frame image into the film entrance 261 of the adjacent information card preparation apparatus 243. It is also possible to put the prepared index prints together with the photo prints P of the order at the sorting section 248.

The photo-printing and developing apparatus 241 of FIG. 17 comprises a printing section 244, a developing section 245, a drying section 46, a paper cutting section 247, and an order sorting section 248, and prints the frame image of the developed film F inserted into the negative mask 251 to a band-form photographic paper set to a paper magazine 252, develops, dries, and then, cuts off frame by frame at the paper cutting section, and discharges to the order sorting section 248 order by order. The one order means one piece of film inserted into the film cartridge.

To the photo-printing and developing apparatus 241, CPU is built in, and to the information card preparation apparatus 243, the storage (storage means in claims) is built in. These are linked by the information transmission cord 255 (take-in means in claims). With this configuration, the required information can be taken in from the photo-printing and developing apparatus 241 to the information card preparation apparatus 243.

FIG. 18 is a view explaining the internal constitution of the information card preparation apparatus 243.

The index print preparation means in the information card preparation apparatus 243 is equipped with a scanner 262, a print head 263, a roll paper 264, a paper cutter 265, and a storing section 266 in addition to a film slot 261. The index print preparation means reads images of the film F inserted from the entrance 261 by the scanner 262, prints on the roll paper by the print head 263, cuts into a suitable size by the paper cutter 265, and temporarily stores at the storing section 266. From there, the index print IP is transported to the sorting section 248 by a transporting means 269 and put together with corresponding photo prints P.

The information card preparation apparatus 243 is equipped with a take-in means 255 (refer to FIG. 17), a memory 256 for storing in memory the information taken in by the take-in means, and a printer 257 (a recording means in claims). The printer 257 prints the bar code and/or alphanumeric characters and kana characters, and a bar code printer and a dot printer might be combined. In addition to the dot printer, a thermal dye sublimation transfer printer and an ink jet printer can be used.

Furthermore, the information card preparation apparatus 243 can adopt the scanner 262 as a reading means in claims. In such case, the scanner 262 reads the order number in addition to the images and extracts the corresponding information from the memory 256, and records on the rear surface of the index print by the printer 257.

As shown in FIG. 17, it is possible to provide a keyboard 254 (input device in claims) to the information card preparation apparatus 243, to allow the operator to enter the order number through the keyboard 254 and to extract the corresponding information from the memory 256.

Figure 19:
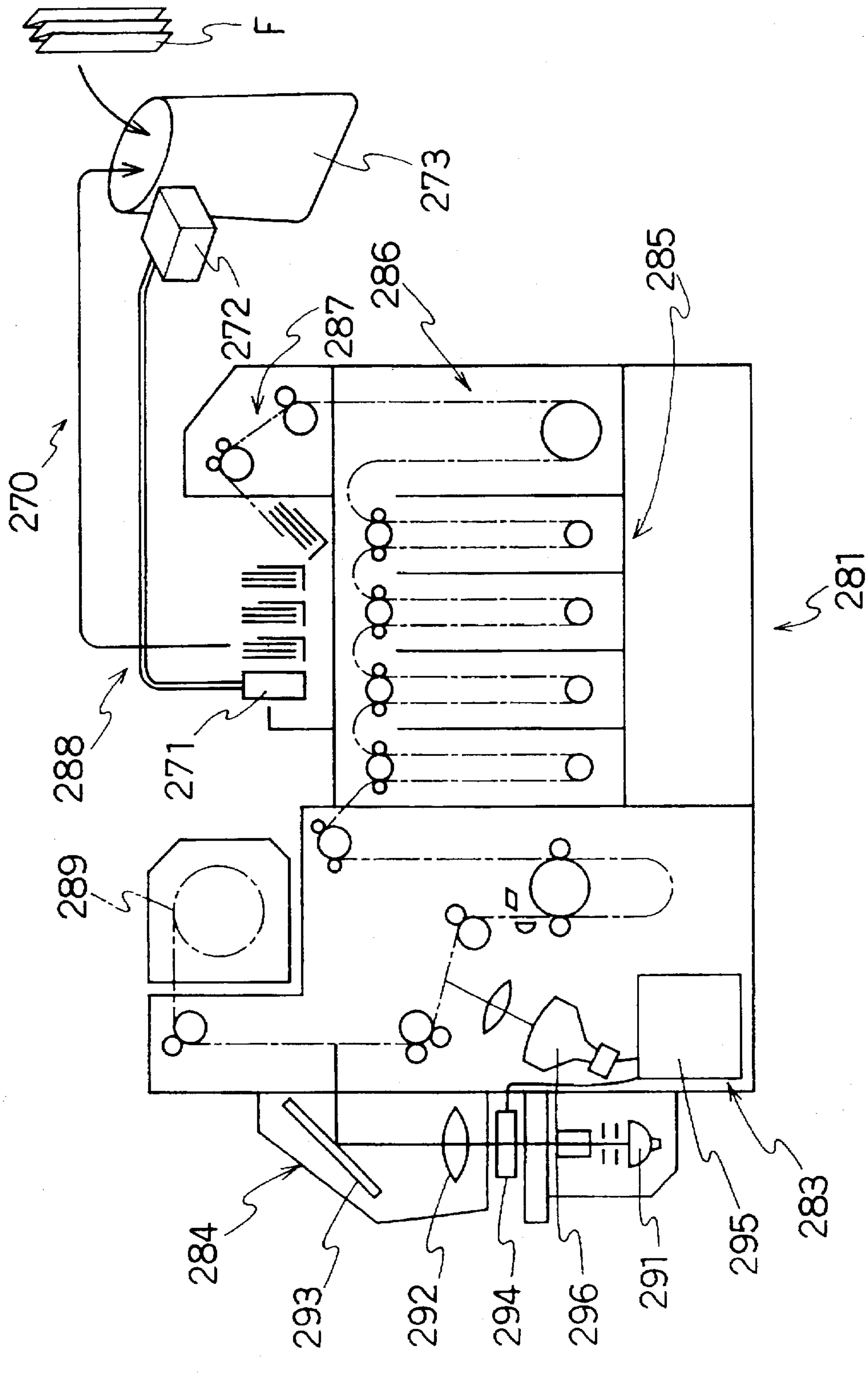
FIG. 19 is an explanatory view showing one embodiment of the photo-printing apparatus and the photo-finishing apparatus.

Now referring to FIG. 19, one embodiment of the photo-printing equipment with the information card preparation means built in is explained.

As shown in FIG. 19, to the photo-printing apparatus 281, an information card preparation means 283 is built in.

The photo-printing apparatus 281 comprises a printing section 284, a developing section 285, a drying sect ion 286, a paper cutting sect ion 287, and a sorting section 288. The printing section 284 contains a light source 291, a lens 292, and a mirror 293 and prints images on the band-form photographic paper 289.

The photo-printing apparatus equipped with the information card preparation means of the present invention has a constitution for recording the information on the band-form photographic paper (paper) like in the case of the photo prints, and the information recording method can be classified into the following three cases depending upon the paper to which the information is recorded. That is, ① the information is recorded on the rear surface of one or a plurality of regular prints in one order, ② the information is recorded on the front surface (image formed surface) or the rear surface of the index print before the first frame or after the last frame for each order, and ③ the index print is not printed but only the information is recorded. According to these methods, the photo prints and the information card can be easily put together and it does not take much time to collate them.

The photo-printing apparatus 281 shown in FIG. 19 is the type which records the information on the image forming surface of the index print.

The information card preparation means 283 comprises a take-in means 294, a control mechanism 295, and CRT 296, and the images and the information read by the take-in means 294 are stored by the control mechanism 295, and are edited in one card (the images and information can be edited in a plurality of cards). The regular photo print is successively printed on the paper, and to the frame after the last frame image is printed, the image and information edited in one card are printed.

The take-in means 294 is preferably a scanner for taking in the image and information simultaneously, but the take-in means for taking in the information only might be separately disposed. In such case, the take-in means might be appropriately selected from bar code reader, magnetic reader and the like in consideration of the reading means used for other portions.

In the above-mentioned photo-printing apparatus 281, it is possible to prepare the information card, even if a scanner for preparing the index print is not provided but any take-in means for taking in the information is provided. In the photo-printing apparatus 281 of the constitution shown in FIG. 19, if the take-in and recording of the frame image is deleted, the information dedicated card can be prepared together with the regular prints.

In addition, the existing photo-printing apparatus with no index print preparation means might be properly improved to have a means for taking in the information, a control means for storing the information, and a recording means so that the information can be recorded on the rear surface of one or a plurality of regular print in one order. If the regular print is used in this way for the information card, the improvement of the apparatus would be the easiest.

The information card printed in this way is cut into the size of one piece of print at the paper cut section 287 after being processed at the developing section 285 and the drying section 286, and discharged to the sorting sect ion 288. The first tray which receives the print to be discharged to the sorting section 288 is tilted, and piles and holds the prints successively. In this event, the image formed surface is directed above.

To the photo-printing apparatus 281 shown in FIG. 19, the photo-finishing apparatus 270 of the present invention is provided.

This photo-finishing apparatus 270 is equipped with a bar code reader (a reading means in claims) 271 and a price printer (a price calculating and displaying means in claims) 272.

On the other hand, as described above, the information card is printed at the last part of the order and at the sorting section 288, the information card is placed on the top of the order and with the image formed surface (surface with the information also written) above.

Therefore, the sorting section 288 transports the tray ahead of the bar code reader 271, allows the bar code reader to read the information recorded in the information card. Then the price printer 272 prints the price on the DP bag 273.

In this way, the photo-printing apparatus 281 shown in FIG. 19 automatically carries out collation of the film, index print, and photo print, calculation of the price, and printing of the price on the DP bag 273.

It is also possible to prepare a printed seal and to adhere the seal to the DP bag 273 without directly printing the photo processing price on the DP bag 273.

Now referring to FIGS. 20 and 21, the photo-finishing apparatus will be explained.

Figure 20:
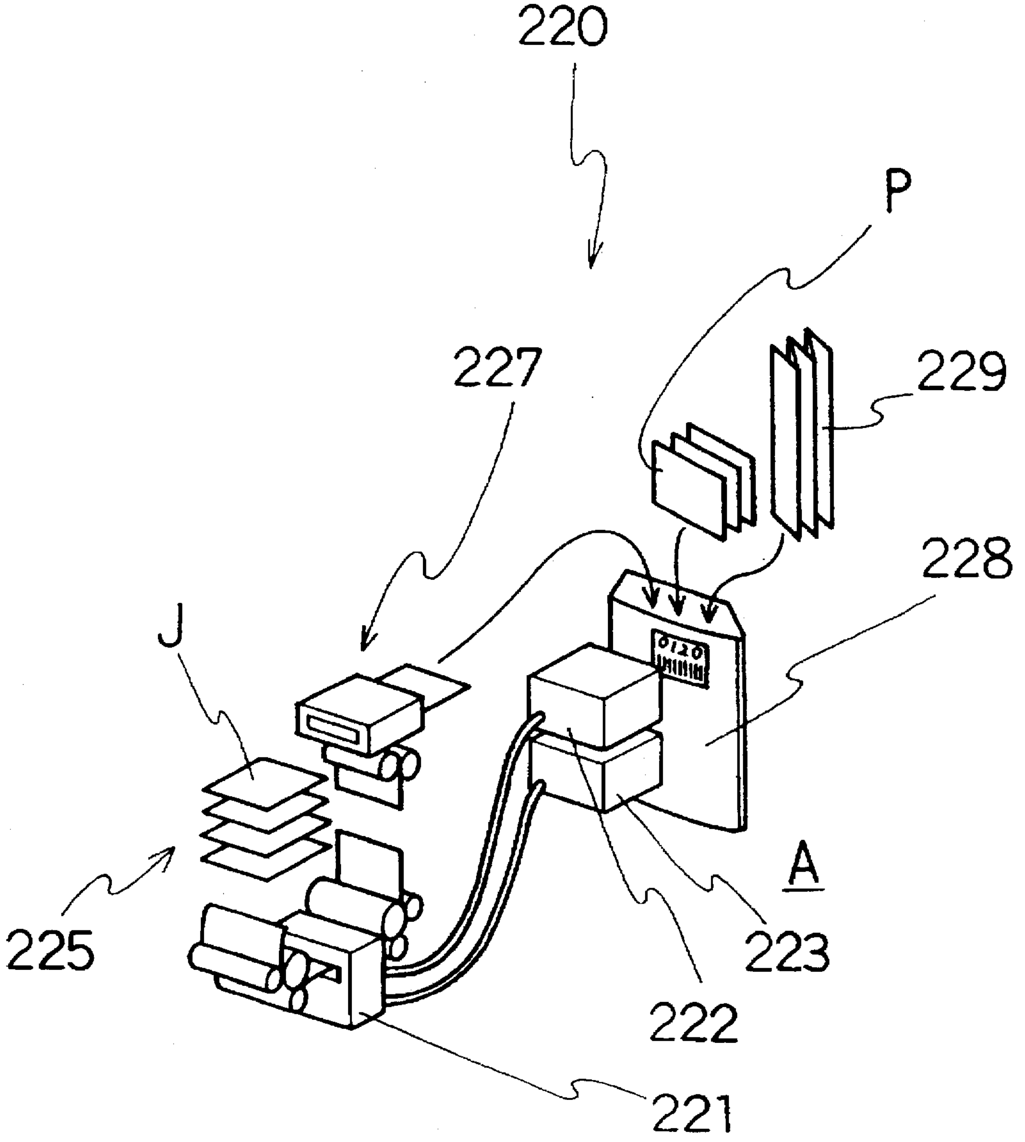
FIG. 20 is an explanatory view showing another embodiment of the photo-finishing apparatus.

The photo-finishing apparatus 220 shown in FIG. 20 collates the information card placed into the corresponding DP bag 228, and calculates and prints the price simultaneously. The apparatus 220 is equipped with an information card storing section 225, bar code readers (reading means in claims) 221, 222, a price printer (price calculating and displaying means in claims) 223, and an extracting section 227.

Next explanation will be made on the operation of the photo-finishing apparatus 220.

The order number described on the DP bag 228 placed at the feeding position A is read by the bar code reader 222, and the corresponding information card J is extracted from the information cards J stored in the storing section 225. This apparatus is so designed as to circulate the photo information card J from the storing section 225 to the storing section 225 again through the bar code reader 221 and the extraction section 227. When the information card J of the number same as the order number read by the bar code reader 222 passes the bar code reader 221, the extraction section 227 transports the information card J to the feeding position A, enabling the price printer 223 to calculating the price and print it on the DP bag 228. At the feeding position A, collation of photo print P and film 229 to be placed in the DP bag 228 is carried out in addition to the collation of information card, and all are placed in the DP bag.

In the regular photo-processing operation, when the film is received from the customer, the name of the customer and the place of contact are described on the DP bag. In addition, seals carrying the same order number are attached to both DP bag and film, and the control thereafter is carried out in accordance with this order number. The above-mentioned photo-finishing apparatus 220 is applied to the films and DP bags whose order number is described with bar codes.

Figure 21:
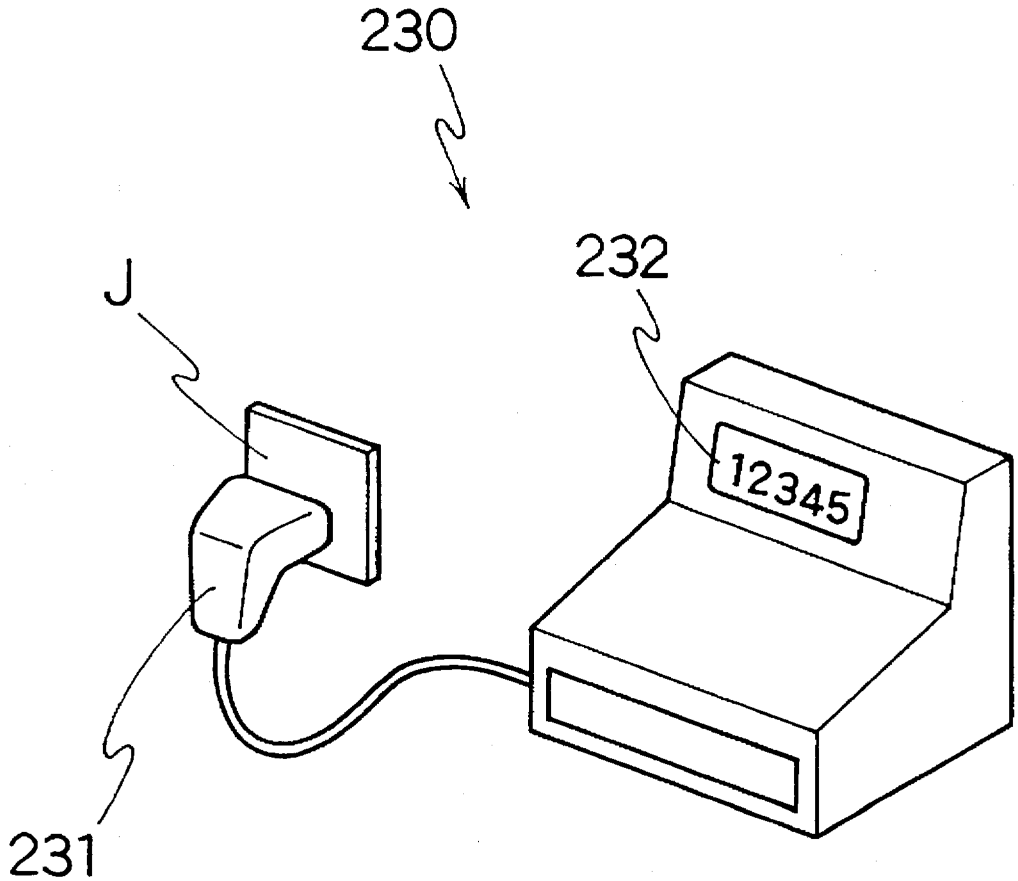
FIG. 21 is an explanatory view showing still another embodiment of the photo-finishing apparatus.

The photo-finishing apparatus 230 shown in FIG. 21 comprises a mechanism for reading the information of the information card J and a regular register system, and numeral 231 is a bar code reader. In this apparatus, at the register, the price is displayed on a price display 232 to be indicated to the customer and the like. With this configuration, the mistake in price registration can be prevented, and the operability at the register can be improved.

The information card J is generally placed in the DP bag together with regular prints, but when the photo-finishing apparatus 230 is used, the use of the information card which can be affixed to the DP bag achieves easy application to the bar code reader 231.

Figure 22:
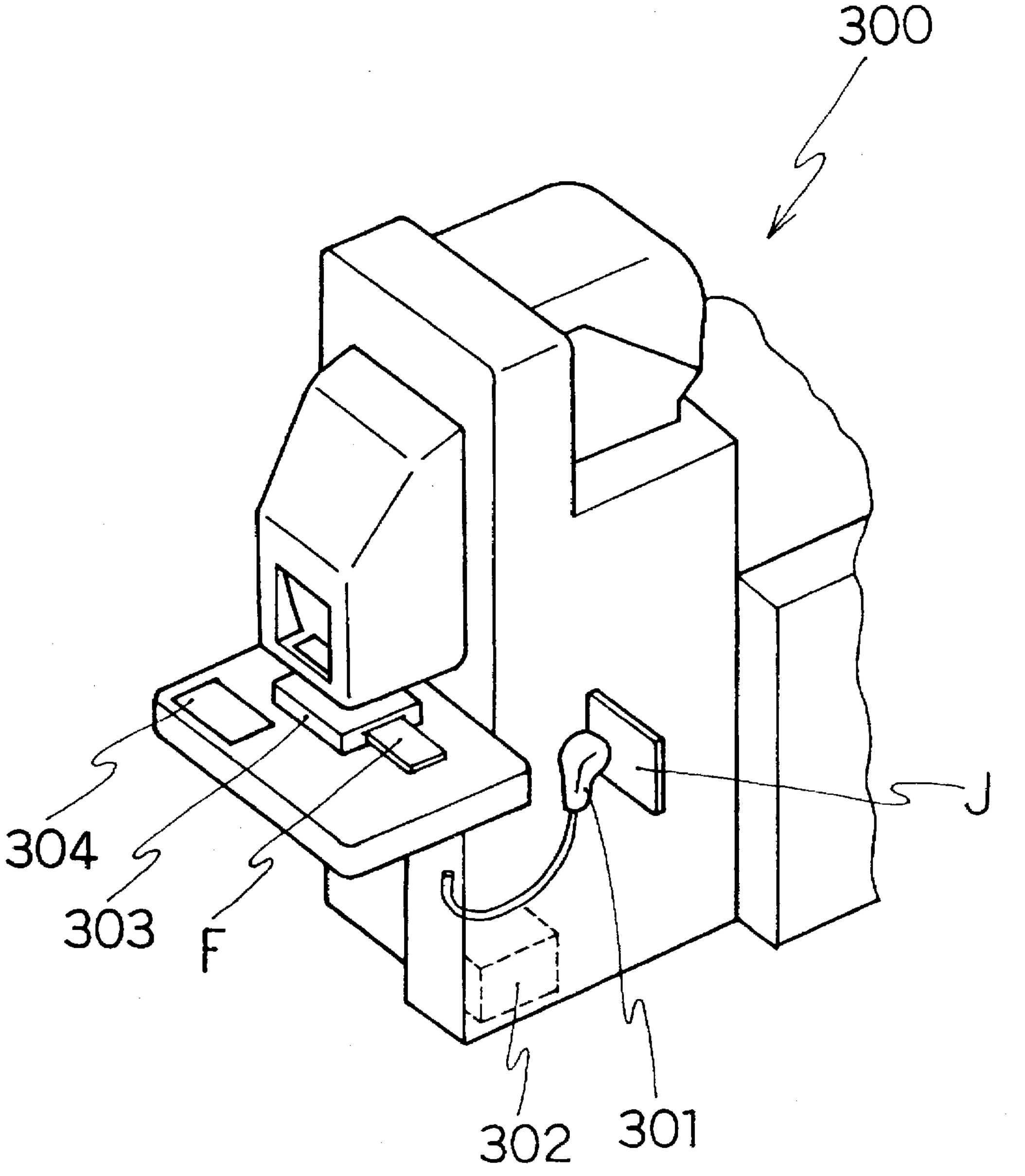
FIG. 22 is an explanatory view showing one embodiment of a reprinting apparatus.
Figure 23:
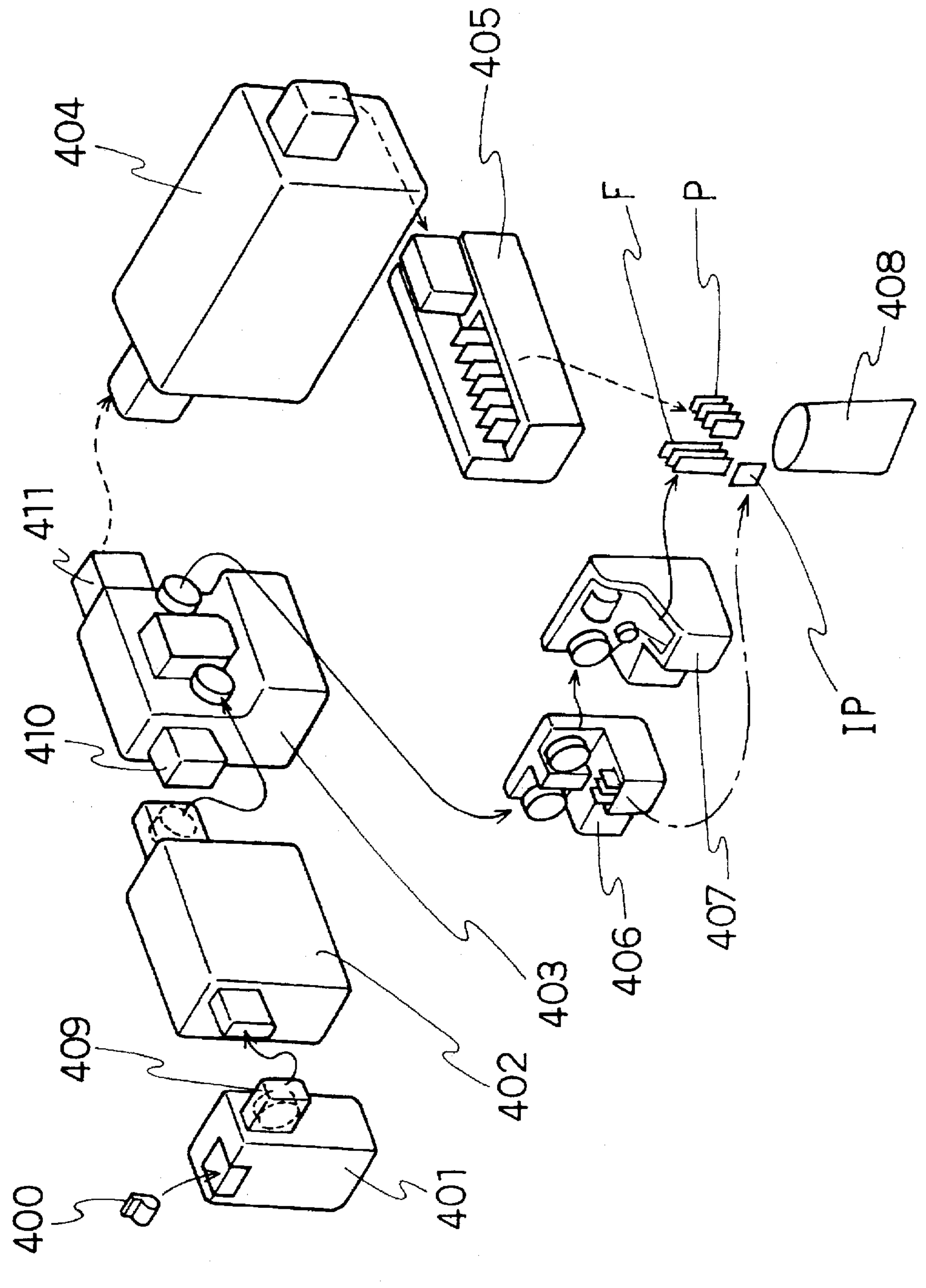
FIG. 23 is an explanatory view showing a conventional printing and developing system of photographs as well as an index print preparation system.

Now, referring to FIG. 22, the reprinting method and the apparatus are explained.

This reprinting apparatus 300 is equipped with a bar code reader 301 and reads information related to photo printing at the time of printing and developing of each frame from the information card J, and stores the information in the internal memory 302 of the reprinting apparatus. The film F is inserted into the negative mask 303 and the ordered frame number for reprinting and the number of reprints are entered through the keyboard 304. Then, the information related to printing of the corresponding frames is extracted from the memory, and printing takes place under the extracted printing conditions.

The reprinting method and apparatus of the present invention might determine the extracted conditions as reprinting conditions as they are, but it might be designed to carry out operations of reading the recorded information of density correction values of printing, correction of each of YMC colors (yellow magenta, cyanic), and the light source color and confirming the execution of correction control of the photo-printing apparatus.

With this configuration, the print size same as that at the time of printing and developing is achieved, and in addition, unification the light-source correction enables the reprint with the similar color tone.

As described above, because the index print collating apparatus of the present invention carries out the collating operation in accordance with the order number, mistakes in collation due to similar screens can be eliminated.

Automatization is easy and the efficiency of the collating operation can be improved.

Further, because in the information card of the present invention and the apparatus using the information card, all the information required for calculating the photo-processing price can be obtained for each order by the information card, calculation of the photo-processing price for each order and display of the results can be easily automatized.

It is no longer necessary to count the number of prints while watching the film images, but just looking at the information card of the present invention enables the reading of the number of prints for each order, thereby improving visual workability in checking and collating, for example, the number of prints for each order.

In addition, it becomes easy to unify the quality of the reprints and the prints printed and developed.

Though several embodiments of the present invention are described above, it is to be understood that the present invention is not limited only to the above-mentioned and various changes and modifications may be made in the invention without departing from the spirit and scope thereof.

What is claimed is:

1. An index print preparation and feeding apparatus comprising:

a means for preparing index prints in which a multiplicity of frame images of a film can be printed on one print, an order identifying means for identifying order information of the film, a means for storing a multiplicity of the index prints, a collating means which has a first identifying mechanism for recognizing the order information of the index print stored in the storing means and a second identifying mechanism for recognizing the order information on a DP bag or film placed at a feeding position, and which collates the order information recognized by the first and the second mechanisms, and a means for feeding the index print checked by the collating means to match with order information to the feeding position.

2. The apparatus of claim 1, wherein the order identifying means is a means for idetifying the order by reading the order information recorded beforehand on the film or DP bag.

3. The apparatus of claim 1, wherein the order idetifying means is a means for identifying the order by input by an operator.

4. The apparatus of any one of claims 1 to 3, wherein an order recording means for recording the order information to the corresponding index print is linked to the order identifying means, and the first identifying mechanism is designed to read the order information recorded on the index print by the order recording means.

5. The apparatus of any one of claims 1 to 3, wherein the storing means has a multiplicity of storing means and the first identifying mechanism is designed to recognize the order information of the index prints corresponding to the storing position.

6. The apparatus of any one of claims 1 to 3, wherein the second identifying mechanism is designed to read the order information recorded on the DP bag or film placed at the feeding position.

7. The apparatus of any one of claims 1 to 3, wherein the second identifying mechanism is designed to recognize order information by input by an operator.

8. A photo-printing and developing apparatus comprising:

a photo-printing and processing section comprising an order sorting means that can sort and hold printed and developed photographs in accordance with order, a first recording means for recording corresponding information order by order on the printed photographs, and a first reading means for reading the order information recorded by the first recording means and storing in memory the order number of the printed photographs stored at the order sorting section, and an index print preparation section comprising an index print preparation means for preparing an index print of the printed photographs for each order, a second recording means for recording the order information on the corresponding index print, and a second reading means for reading order information recorded by the second recording means wherein the photo-printing and developing apparatus is designed to collate the printed photographs with the order information recorded on the index print and feeding the corresponding index print to the printed photographs sorted order by order by the order sorting means.

9. A photo-printing and developing apparatus including a built-in index print printing means for preparing an index print which corresponds to a series of frames of one order to be photo-printed and developed in the apparatus, wherein the index print is printed before printing a first frame of the series of frames or after printing a last frame of the series of frames.

10. The apparatus of claim 9, wherein the apparatus is so designed to read the image information of each frame one order by a scanner, transmits the information to the digital system index print printing means, and print the index print.

11. The apparatus of claim 9, wherein the index print printing means comprises a printing lens exchanging means or printing lens moving means, and a paper mask which shields light at an optional position of a frame.

* * * * *